(12) United States Patent
Kwak et al.

(10) Patent No.: US 12,175,903 B2
(45) Date of Patent: Dec. 24, 2024

(54) ELECTRONIC DEVICE INCLUDING DISPLAY AND METHOD FOR MEASURING MOVEMENT DISTANCE OF DISPLAY

(71) Applicant: SAMSUNG ELECTRONICS CO., LTD., Suwon-si (KR)

(72) Inventors: Myunghoon Kwak, Suwon-si (KR); Jooyoung Kang, Suwon-si (KR); Gisoo Lim, Suwon-si (KR); Byunghun Cho, Suwon-si (KR); Joongyeon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 17/855,279

(22) Filed: Jun. 30, 2022

(65) Prior Publication Data

US 2022/0335869 A1 Oct. 20, 2022

Related U.S. Application Data

(63) Continuation of application No. PCT/KR2021/000488, filed on Jan. 13, 2021.

(30) Foreign Application Priority Data

Mar. 9, 2020 (KR) .................... 10-2020-0029006

(51) Int. Cl.
*G06T 15/00* (2011.01)
*G01D 5/14* (2006.01)
(Continued)

(52) U.S. Cl.
CPC ............ *G09G 3/035* (2020.08); *G01D 5/142* (2013.01); *G01D 5/16* (2013.01); *G09G 2340/04* (2013.01);
(Continued)

(58) Field of Classification Search
CPC ...... G06F 3/147; G06F 1/1652; G06F 1/1624; G06F 1/1677; H04M 1/0268;
(Continued)

(56) References Cited

U.S. PATENT DOCUMENTS

| 9,651,997 B2 | 5/2017 | Browning |
| 10,362,690 B2 | 7/2019 | Han |

(Continued)

FOREIGN PATENT DOCUMENTS

| JP | 2003-295291 | 10/2003 |
| JP | 2005-321702 | 11/2005 |

(Continued)

OTHER PUBLICATIONS

Boring S, Jurmu M, Butz A. Scroll, tilt or move it: using mobile phones to continuously control pointers on large public displays. InProceedings of the 21st Annual Conference of the Australian Computer-Human Interaction Special Interest Group: Design: Open 24/7 Nov. 23, 2009 (pp. 161-168).*

(Continued)

*Primary Examiner* — Phu K Nguyen
(74) *Attorney, Agent, or Firm* — Nixon & Vanderhye P.C.

(57) ABSTRACT

Disclosed is an electronic device that may include: a housing formed to surround a first surface facing a first direction, a second surface facing a second direction that is the opposite direction of the first direction, and at least part of the space between the first surface and the second surface; a PCB disposed in the space of the housing; a display extending in a third direction, which is different from the first direction and the second direction, and displaying a screen; and at least one processor, wherein the PCB includes a plurality of detection units, a detection target to be detected by least one of the plurality of detection units is disposed within a specific distance in the second direction of the display, and (Continued)

the processor may be set to calculate movement information including at least one among the movement start position of the display, the movement end position of the display, and the movement distance of the display on the basis of at least sensing data received from the plurality of detection units.

13 Claims, 29 Drawing Sheets

(51) Int. Cl.
  *G01D 5/16* (2006.01)
  *G09G 3/00* (2006.01)
  *H04M 1/02* (2006.01)
(52) U.S. Cl.
  CPC ....... *G09G 2354/00* (2013.01); *H04M 1/0268* (2013.01)
(58) Field of Classification Search
  CPC ............ H04M 1/0237; G09G 2380/02; G09G 2340/04; G09G 2354/00; G09G 3/035; G01D 5/142; G01D 5/16
  USPC ......................................................... 345/418
  See application file for complete search history.

(56) References Cited

U.S. PATENT DOCUMENTS

| | | | | |
|---|---|---|---|---|
| 10,936,100 B2 * | 3/2021 | Park | ....................... | G06F 1/1677 |
| 11,720,141 B2 * | 8/2023 | Kim | ....................... | G06F 1/3209 |
| | | | | 345/173 |
| 11,720,147 B2 * | 8/2023 | Prushinskiy | .......... | G06F 1/1624 |
| | | | | 361/679.27 |
| 11,776,440 B2 * | 10/2023 | Kim | ....................... | G06F 1/3212 |
| | | | | 345/212 |
| 11,783,769 B2 * | 10/2023 | Huang | .................. | G06F 1/1652 |
| | | | | 345/204 |
| 11,785,126 B2 * | 10/2023 | Park | ....................... | G06F 1/1637 |
| | | | | 381/338 |
| 11,790,820 B2 * | 10/2023 | Kwak | ..................... | G06F 3/011 |
| | | | | 345/173 |
| 11,815,959 B2 * | 11/2023 | Kim | ....................... | G06F 1/1624 |
| 11,860,694 B2 * | 1/2024 | Shin | ....................... | G06F 1/1637 |
| 11,908,362 B2 * | 2/2024 | Eom | ....................... | G09G 3/006 |
| 11,935,445 B2 * | 3/2024 | Min | ....................... | G06F 1/1641 |
| 2017/0212607 A1 * | 7/2017 | Yoon | ....................... | G06F 3/147 |
| 2018/0067521 A1 | 3/2018 | Browning | | |
| 2019/0187759 A1 | 6/2019 | Browning | | |
| 2019/0384438 A1 | 12/2019 | Park et al. | | |
| 2020/0117243 A1 | 4/2020 | Browning | | |
| 2021/0049515 A1 | 5/2021 | Qin et al. | | |
| 2021/0149515 A1 | 5/2021 | Qin et al. | | |

FOREIGN PATENT DOCUMENTS

| | | |
|---|---|---|
| JP | 2006-308911 | 11/2006 |
| KR | 10-2007-0048504 | 5/2007 |
| KR | 10-2009-0030138 | 3/2009 |
| KR | 10-2016-0138939 | 12/2016 |
| KR | 10-2017-0062121 | 6/2017 |
| KR | 10-1752750 | 7/2017 |
| KR | 10-2017-0089664 | 8/2017 |
| KR | 10-2017-0095636 | 8/2017 |
| KR | 10-2019-0141518 | 12/2019 |

OTHER PUBLICATIONS

Gomes A, Priyadarshana LL, Visser A, Carrascal JP, Vertegaal R. Magicscroll: a rollable display device with flexible screen real estate and gestural input. InProceedings of the 20th International Conference on Human-Computer Interaction with Mobile Devices and Services Sep. 3, 2018 (pp. 1-11).*
Extended European Search Report dated May 19, 2023 for EP Application No. 21767300.3.

* cited by examiner

ELECTRONIC DEVICE INCLUDING DISPLAY AND METHOD FOR MEASURING MOVEMENT DISTANCE OF DISPLAY

CROSS-REFERENCE TO RELATED APPLICATIONS

This application is a continuation of International Application No. PCT/KR2021/000488 designating the United States, filed on Jan. 13, 2021, in the Korean Intellectual Property Receiving Office and claiming priority to Korean Patent Application No. 10-2020-0029006, filed on Mar. 9, 2020, in the Korean Intellectual Property Office, the disclosures of which are incorporated by reference herein in their entireties.

BACKGROUND

Field

The disclosure relates to a technology for implementing an electronic device including a display and a method for measuring a movement distance of the display.

Description of Related Art

An electronic device may display an image through a display disposed on a surface of the housing. A plurality of pixels for displaying the image may be disposed in the display. The display may receive signals and voltages for displaying the image from a display driver IC (DDI). Each of the plurality of pixels may receive a data voltage corresponding to the brightness and color of the image to be displayed in the current frame from the display driver IC.

The display may maintain the size of a display area constant. The display driver IC may turn on or turn off the display. The display driver IC may change an active area of the display based on a scenario specified by UX or SW. A processor may determine whether the display is turned on or turned off. The processor may identify an active area and a non-active area of the display area. Here, the active area may be an area in which contents are displayed. Here, the non-active area may be a display area that displays a black screen or that is partially turned off.

Recently, an electronic device including an extendable display of a slidable or rollable type in which only a partial area of the display is exposed and used and the size of a display area of the display is changed as needed has been developed. An extending portion that is a partial area of the display may be disposed inside the electronic device and may be extended outside the electronic device. The extending portion of the display may show an additional display area to a user. When the extending portion is extended outside the electronic device, contents may be additionally displayed in the additional display area.

A processor of the existing electronic device may determine only whether the display is turned on or turned off and is activated. Meanwhile, it may not be easy for the processor to measure how much the display is moved. That is, it may not be easy for the processor to accurately determine how much the additional display area is shown to the user. Accordingly, contents displayed in the additional display area may be cut off, or the additional display area may appear to be a black screen.

SUMMARY

Embodiments of the disclosure provide a method for measuring a start position and an end position of a display area and a movement distance of a display when moving the display area of the extendable display, and an electronic device to which the method is applied.

An electronic device according to an example embodiment of the disclosure includes: a housing formed to at least partially surround a first surface that faces a first direction, a second surface that faces a second direction opposite to the first direction, and at least a portion of a space between the first surface and the second surface, a PCB disposed in the space, a display extending in a third direction different from the first direction and the second direction and that displays a screen, and at least one processor. The PCB includes a plurality of sensing units each respectively comprising sensing circuitry. A sensing target sensed by at least one sensing unit among the plurality of sensing units is disposed within a specified distance in the second direction of the display. The processor is configured to calculate movement information including at least one of a movement start position of the display, a movement end position of the display, and a movement distance of the display, based on at least sensing data received from the plurality of sensing units.

An electronic device according to an example embodiment of the disclosure includes: a housing including a first surface that faces a first direction, a second surface that faces a second direction opposite to the first direction, and a side surface formed to surround a space between the first surface and the second surface, a PCB disposed in the space of the housing, a display including a first area that is extended in a third direction different from the first direction and the second direction and that displays a screen, a rotating unit, comprising a rotational body, that is disposed on the side surface of the housing and that moves the display, and at least one processor. The PCB includes at least one first sensing unit. A first sensing target sensed by the at least one first sensing unit within a specified distance is disposed in the second direction of the display. The display includes a second area bent by the rotating unit or extended in the third direction of the electronic device. The rotating unit includes at least one second sensing target. At least one second sensing unit which senses the at least one second sensing target is disposed on the side surface of the housing adjacent to the rotating unit. The processor is configured to calculate movement information including a movement distance of the display, based on sensing data received from at least one of the first sensing unit and the second sensing unit.

An electronic device according to an example embodiment of the disclosure includes: a housing including a first surface that faces a first direction, a second surface that faces a second direction opposite to the first direction, and a side surface formed to surround a space between the first surface and the second surface, a PCB disposed in the space of the housing, a display including a first area that is extended in a third direction different from the first direction and the second direction and that displays a screen, and at least one processor. The PCB includes a sensing unit. A plurality of sensing targets sensed by the sensing unit within a first distance that is a specified interval and spaced apart from each other by the first distance are disposed in the second direction of the display. The processor is configured to calculate movement information including a movement start position of the display, a movement end position of the display, and a movement distance of the display, based on sensing data received from the sensing unit.

According to various example embodiments of the disclosure, by accurately measuring a movement distance of a linear part and/or an angle of rotation of a rotating part of an extendable display, how much an additional display area is shown to a user may be determined.

Furthermore, according to various example embodiments of the disclosure, by accurately measuring a start position and an end position of a display area of the extendable display for each detailed section, contents may be smoothly or seamlessly changed and displayed to correspond to the size of the display area.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
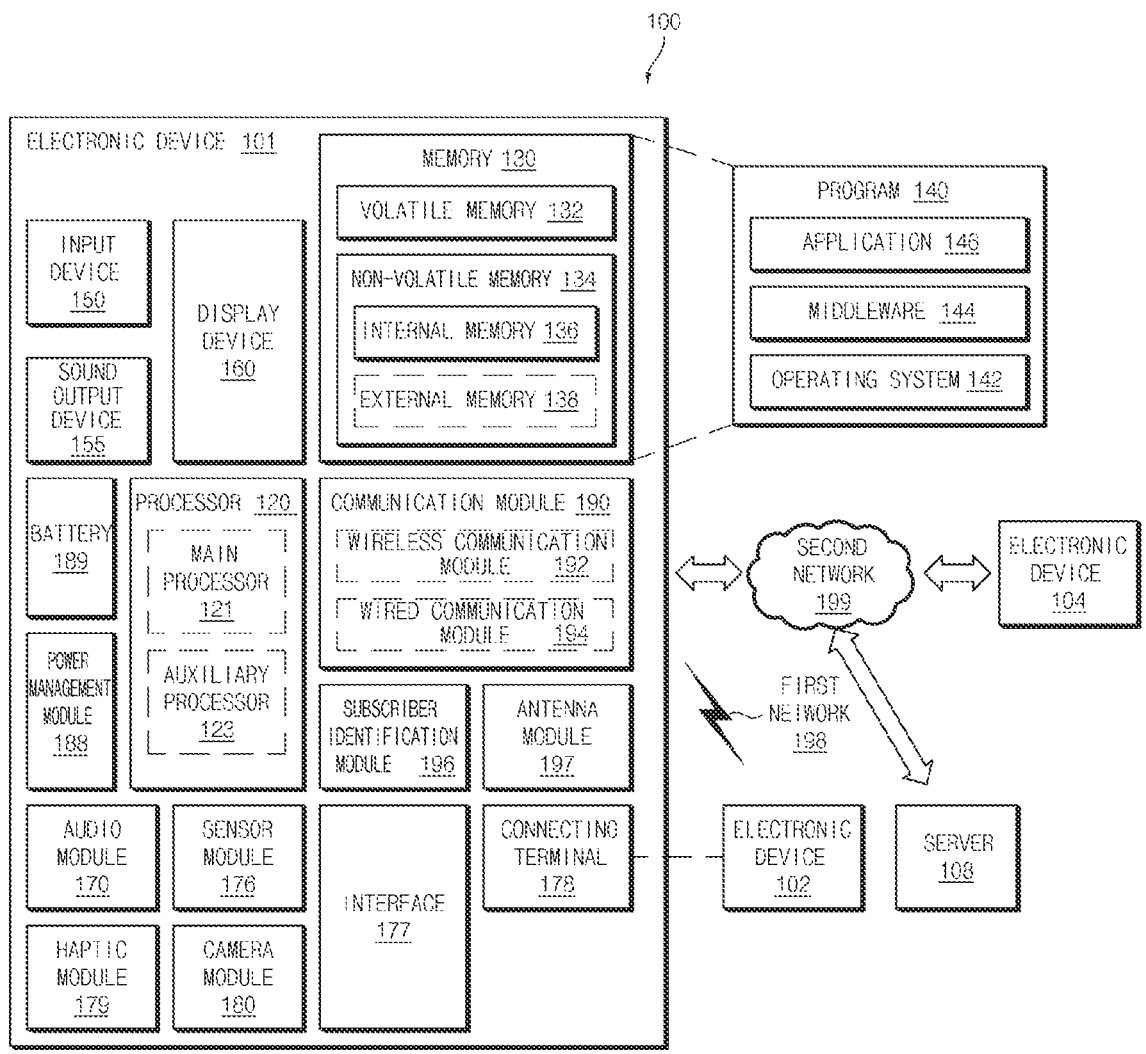
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display). Each "module" herein may comprise circuitry.

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
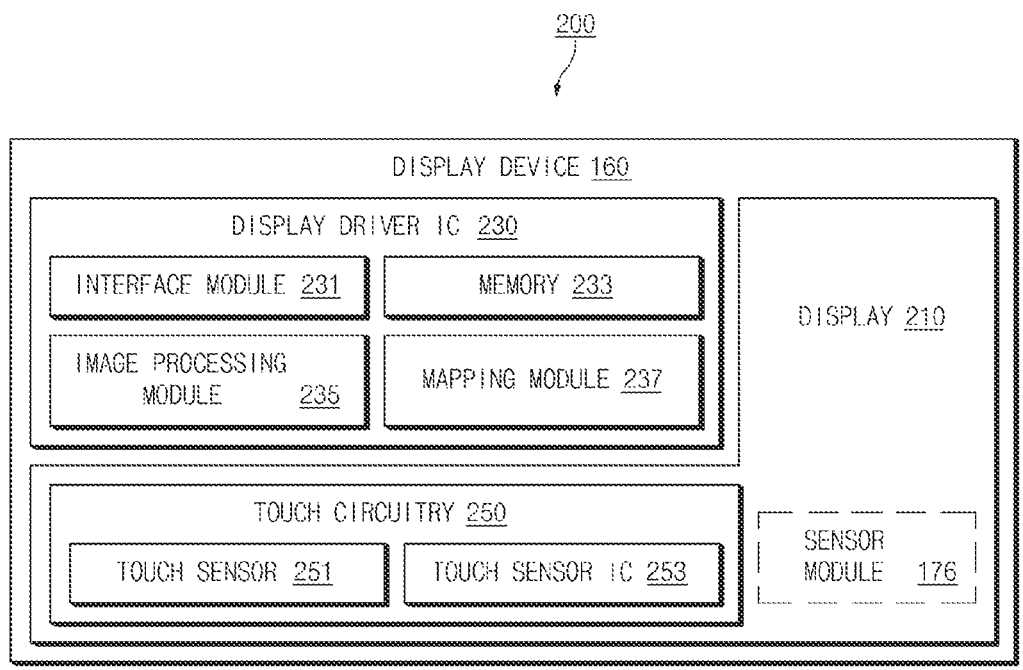
FIG. 2 is a block diagram illustrating the display device according to various example embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each sub-pixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3A:
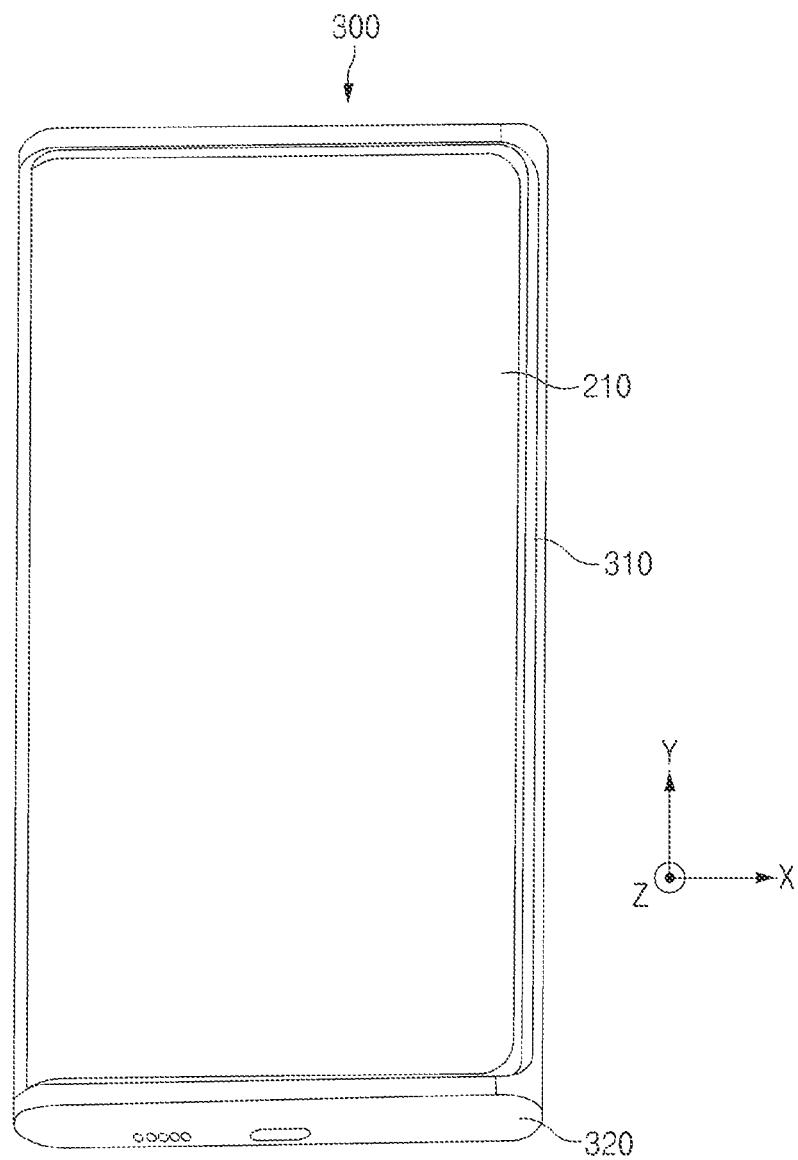
FIG. 3A is a front view illustrating a normal mode of a display of an electronic device according to various example embodiments.

FIG. 3A is a front view 300 illustrating a normal mode of a display 210 of an electronic device (e.g., the electronic device 101 of FIG. 1) according to an embodiment.

In an embodiment, the display 210 of the electronic device 101 may face a first direction (the +Z-axis direction) that is a front side. In front of the electronic device, a user may visually recognize a screen of the display 210.

In an embodiment, a first housing 310 may form a side surface of the electronic device 101. The first housing 310 may protect a side surface of the display 210. The first housing 310 may include an opening formed in a side surface thereof.

In an embodiment, a second housing 320 may form upper and lower exteriors of the electronic device 101. The second housing 320 may protect an upper portion and a lower portion of the display 210. A connector terminal, a microphone hole, a speaker hole, and a sensor hole may be disposed in the second housing 320.

Figure 3B:
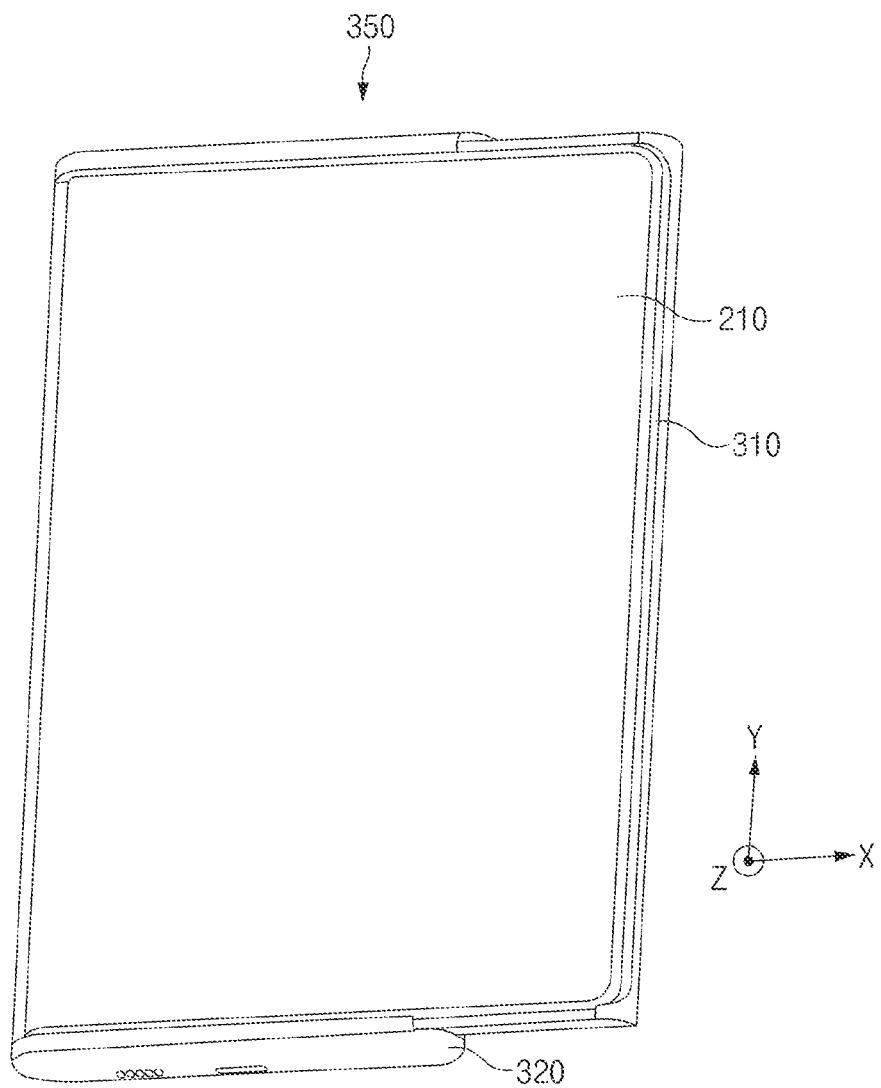
FIG. 3B is a front view illustrating an extended mode of the display of the electronic device according to various example embodiments.

FIG. 3B is a front view 350 illustrating an extended mode of the display 210 of the electronic device (e.g., the electronic device 101 of FIG. 1) according to an embodiment. The extended mode according to an embodiment may be an extended mode implemented by extension of the display device 160 described with reference to FIG. 1. For example, the extended mode may be a mode in which the display device 160 is extended outside the electronic device 101 by a driving unit and/or a rotating unit.

In an embodiment, the display 210 may be extended to a side of the electronic device 101 (e.g., in the +X-axis direction). In the normal mode prior to the extension, the display 210 may be mounted in a state of being bent or rolled on the opposite side to the extension direction in the first housing 310 and the second housing 320. The display 210 may be extended outside the electronic device 101. For example, the display 210 may be extended while being unbent or sliding inside the first housing 310 and the second housing 320, and at least a partial area of the display 210 may protrude from inside the electronic device 101 via the opening formed in the side surface of the first housing 310. Accordingly, the size of the display 210 visually recognized by the user may be increased. In the extended mode of the display 210, the size of the display 210 may be increased by an additional display area, as compared with when the display 210 is in the normal mode. The additional display area may be referred to as the first area in this disclosure.

In an embodiment, the first housing 310 may protect the side surface of the extended display 210. The second housing 320 may fix the upper portion and the lower portion of the display 210 to prevent or reduce the likelihood of the extended display 210 from being separated from the electronic device 101.

Figure 4A:
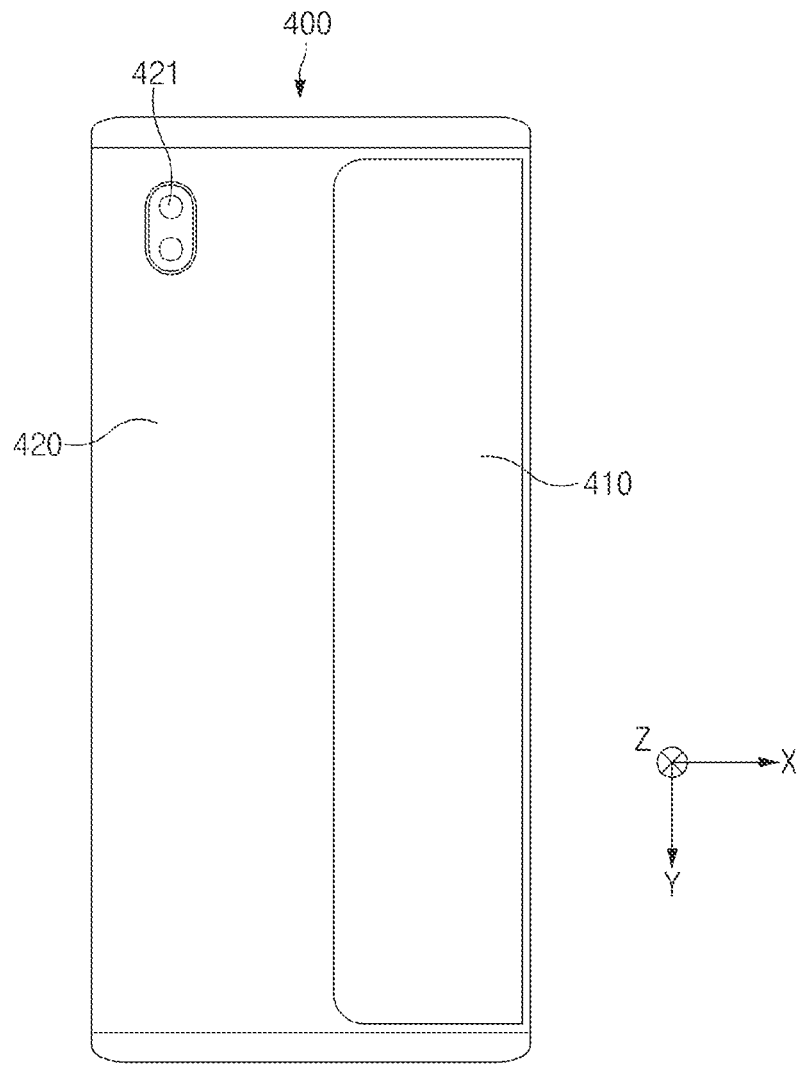
FIG. 4A is a rear view illustrating a normal mode of a display of an electronic device according to various example embodiments.
Figure 4B:
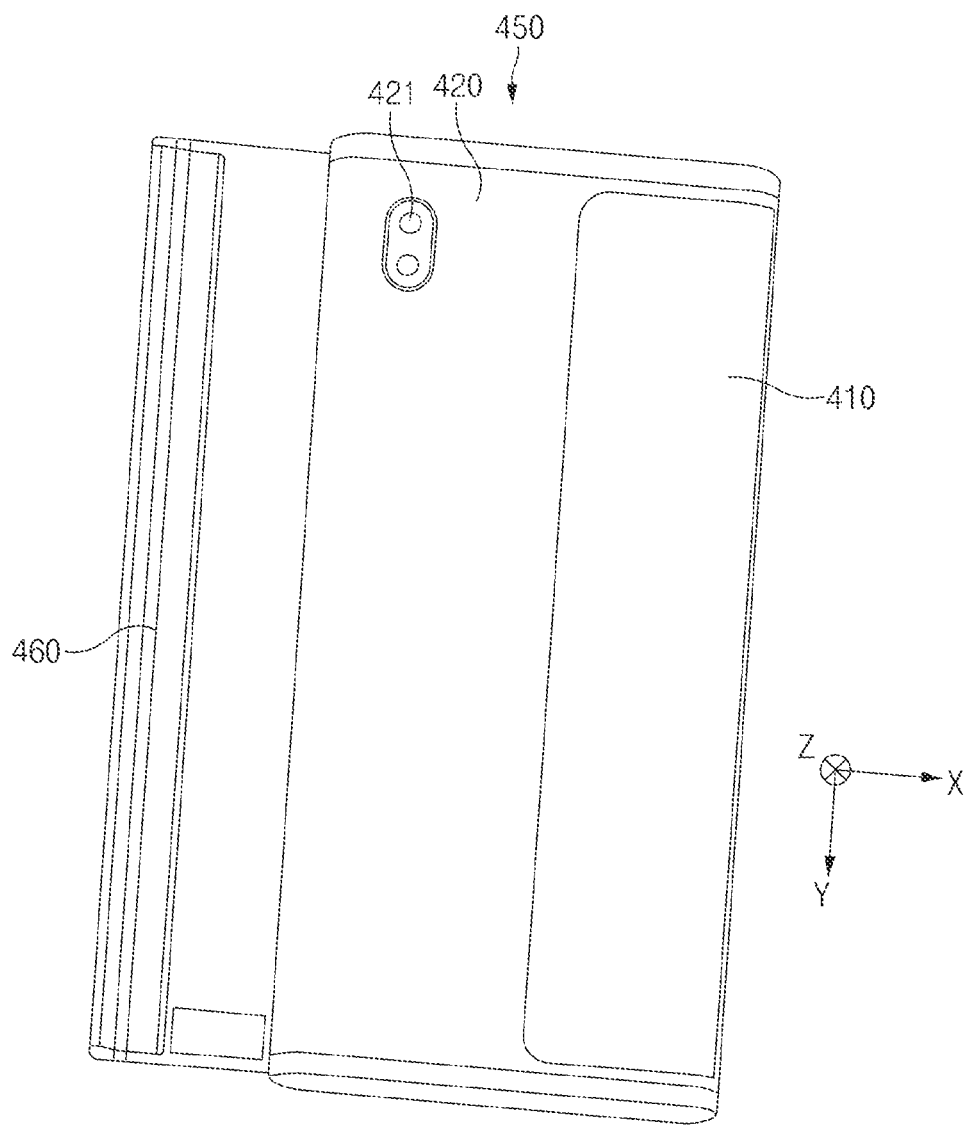
FIG. 4B is a rear view illustrating an extended mode of the display of the electronic device according to various example embodiments.

FIG. 4A is a rear view 400 illustrating a normal mode of a display (e.g., the display 210 of FIG. 3A) of an electronic device (e.g., the electronic device 101 of FIG. 1) according to an embodiment. FIG. 4B is a rear view 450 illustrating an extended mode of the display (e.g., the display 210 of FIG. 3B) of the electronic device 101 according to an embodiment.

In an embodiment, the electronic device 101 may have a sub-display 410, a third housing 420, and a camera hole 421 that face a second direction (the −Z-axis direction) that is a rear side. The sub-display 410 may display contents different from a screen displayed by the display 210. The third housing 420 may protect the rear surface of the electronic device 101. The camera hole 421 may take an image of the outside.

In an embodiment, the display 210 may be extended in a third direction (e.g., the −X-axis direction) perpendicular to the first direction and the second direction to have a larger size than the third housing 420. A protective member 460 may be disposed on the rear surface of the display 210 to protect an edge of the rear surface of the extended display 210.

Figure 5A:
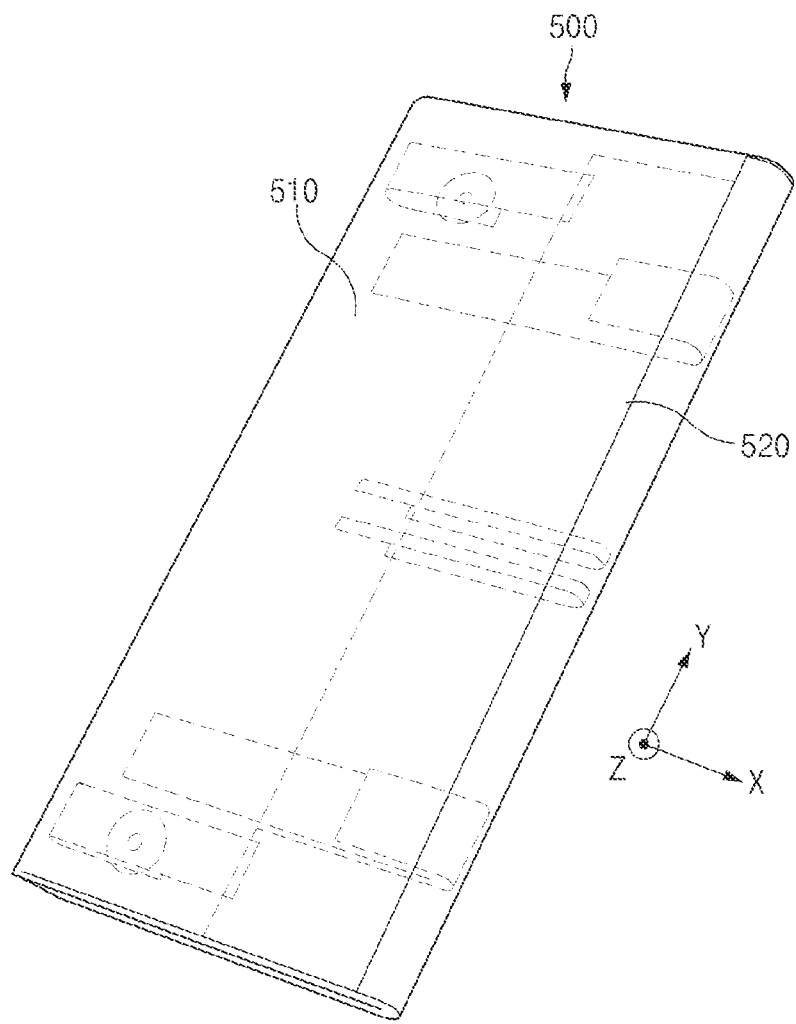
FIG. 5A is a perspective view illustrating a normal mode of a display of an electronic device according to various example embodiments.
Figure 5B:
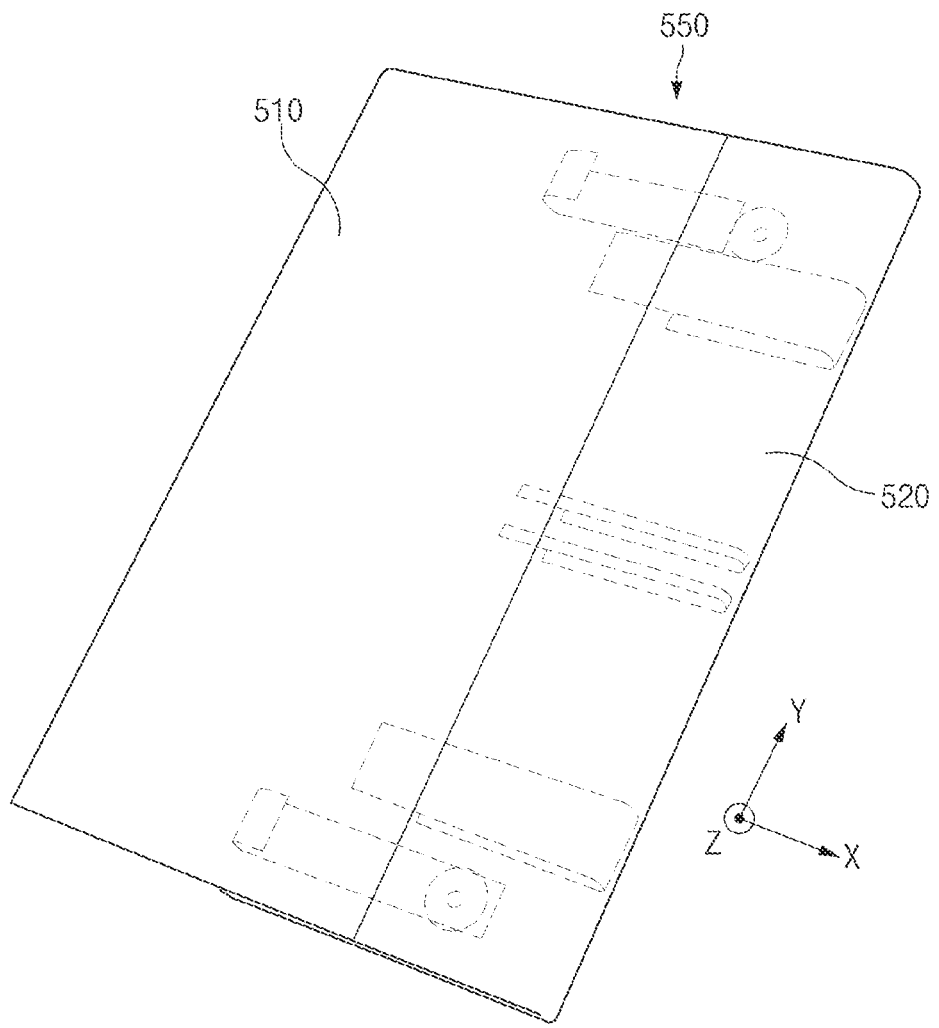
FIG. 5B is a perspective view illustrating an extended mode of the display of the electronic device according to various example embodiments.

FIG. 5A is a perspective view 500 illustrating a normal mode of a display (e.g., the display 210 of FIG. 3A) of an electronic device (e.g., the electronic device 101 of FIG. 1) according to an embodiment. FIG. 5B is a perspective view 550 illustrating an extended mode of the display (e.g., the display 210 of FIG. 3B) of the electronic device 101 according to an embodiment.

In an embodiment, the display 210 may include a first area 510 and a second area 520. The first area 510 and the second area 520 may be connected to each other on at least one boundary and may display one screen including continuous contents. In an embodiment, the first area 510 of the display 210 may be extended in a lateral direction of the electronic device 101. For example, the area of the first area 510 may be increased as the length of the first area 510 in the third direction (the −X-axis direction) is increased.

In an embodiment, the second area 520 of the display 210 may be embedded in a portion of the electronic device 101.

In the extended mode, the second area 520 may be extended outside the electronic device 101 (e.g., in the third direction of the electronic device 101).

Figure 6A:
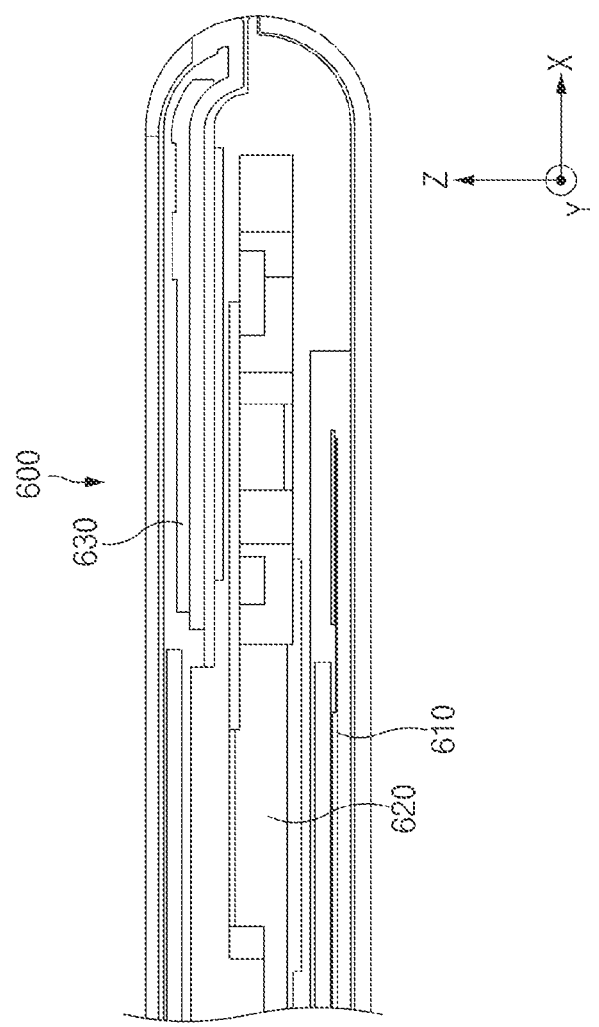
FIG. 6A is a side view illustrating a normal mode of a display of an electronic device according to various embodiments.
Figure 6B:
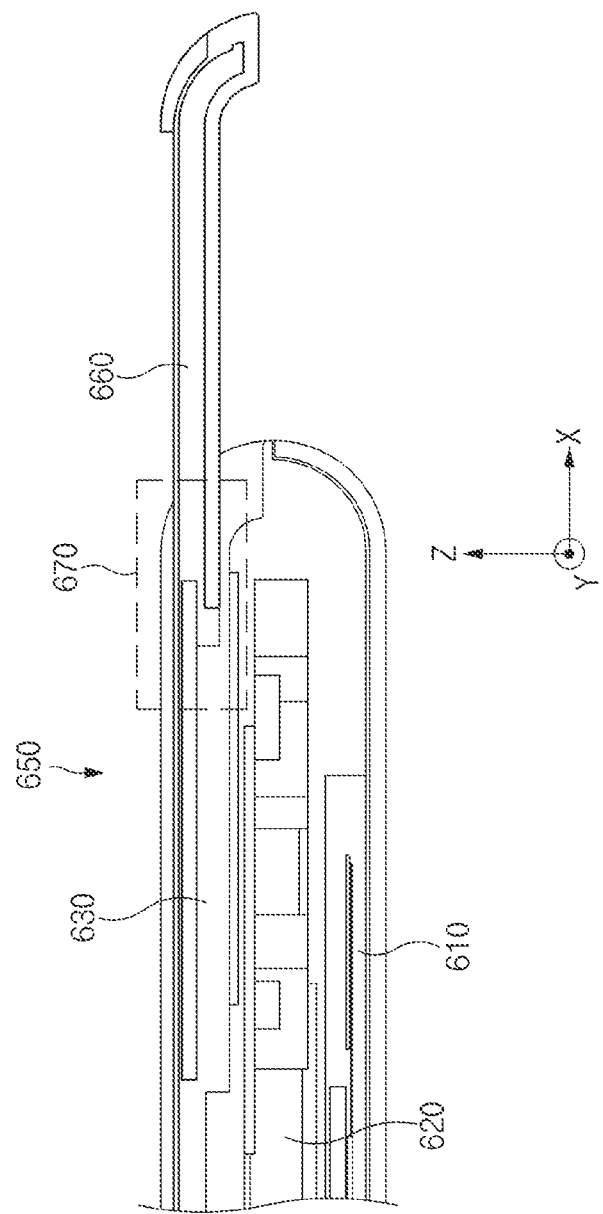
FIG. 6B is a side view illustrating an extended mode of the display of the electronic device according to various example embodiments.
Figure 6C:
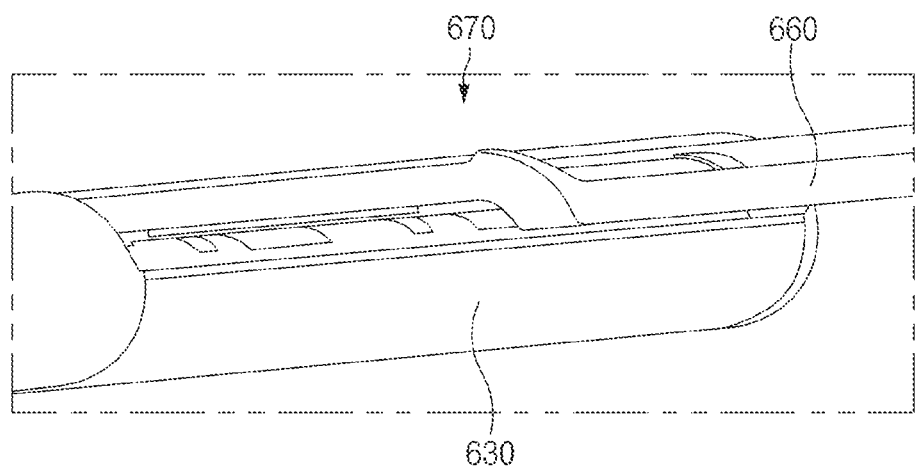
FIG. 6C is an enlarged view of FIG. 6B according to various example embodiments.

FIG. 6A is a side view 600 illustrating a normal mode of a display (e.g., the display 210 of FIG. 3A) of an electronic device (e.g., the electronic device 101 of FIG. 1) according to an embodiment. FIG. 6B is a side view 650 illustrating an extended mode of the display (e.g., the display 210 of FIG. 3B) of the electronic device 101 according to an embodiment. FIG. 6C is an enlarged view 670 of FIG. 6B.

In an embodiment, a third housing 610 (e.g., the third housing 420 of FIG. 4B) may be disposed on the rear surface of the electronic device 101. The third housing 610 may protect the rear surface of the electronic device 101 from an impact.

In an embodiment, a support member 620 may fix the positions of a PCB and the display 210. The support member 620 may be a bracket that supports modules, IC chips, and circuits such that the modules, the IC chips, and the circuits are disposed in specified positions in the inner space of the housing. Each module herein may comprise circuitry.

In an embodiment, a display mounting part 630 may have the display 210 mounted thereon. A transparent reinforced glass or plastic cover may cover the front surface (the +Z-axis direction) of the display mounting part 630 to protect the front surface of the display 210 and to allow a user to visually recognize a screen. A metal sheet (e.g., a Cu sheet) for stably supporting the display 210 may be disposed on the rear surface (the −Z-axis direction) of the display mounting part 630.

In an embodiment, a first area 660 (e.g., the first area 510 of FIG. 5A) may be an extended area of the display 210. Although disposed on the opposite side to the first area 660 (e.g., in the left direction) and omitted in FIG. 6B, a second area (e.g., the second area 520 of FIG. 5A) may be an area in which a portion of the display 210 in an unexposed state inside the electronic device is additionally displayed in the extended mode. For example, the first area 660 may protrude from the display mounting part 630 in the third direction (the +X-axis direction) via an opening of a first housing (e.g., the first housing 310 of FIG. 3A). In another example, the first area 660 may protrude outside the electronic device 101 by a driving unit/driver such as a rail disposed on the display mounting part 630. When the first area 660 is extended, the size of the display 210 visually recognized by the user may be increased. Due to the first area 660, the area of the display 210 may be larger than the area of the front surface of the electronic device 101, and thus a large screen may be used as needed.

In an embodiment, referring to the enlarged view of FIG. 6C, the first area 660 may be mounted on the display mounting part 630, or may be extended from the display mounting part 630 to the outside, by using a groove structure provided on an upper portion of the display mounting part 630. One end of the first area 660 may have a shape corresponding to the first housing 310. For example, the one end of the first area 660 may include a curved surface having a curvature corresponding to the first housing 310.

Figure 7:
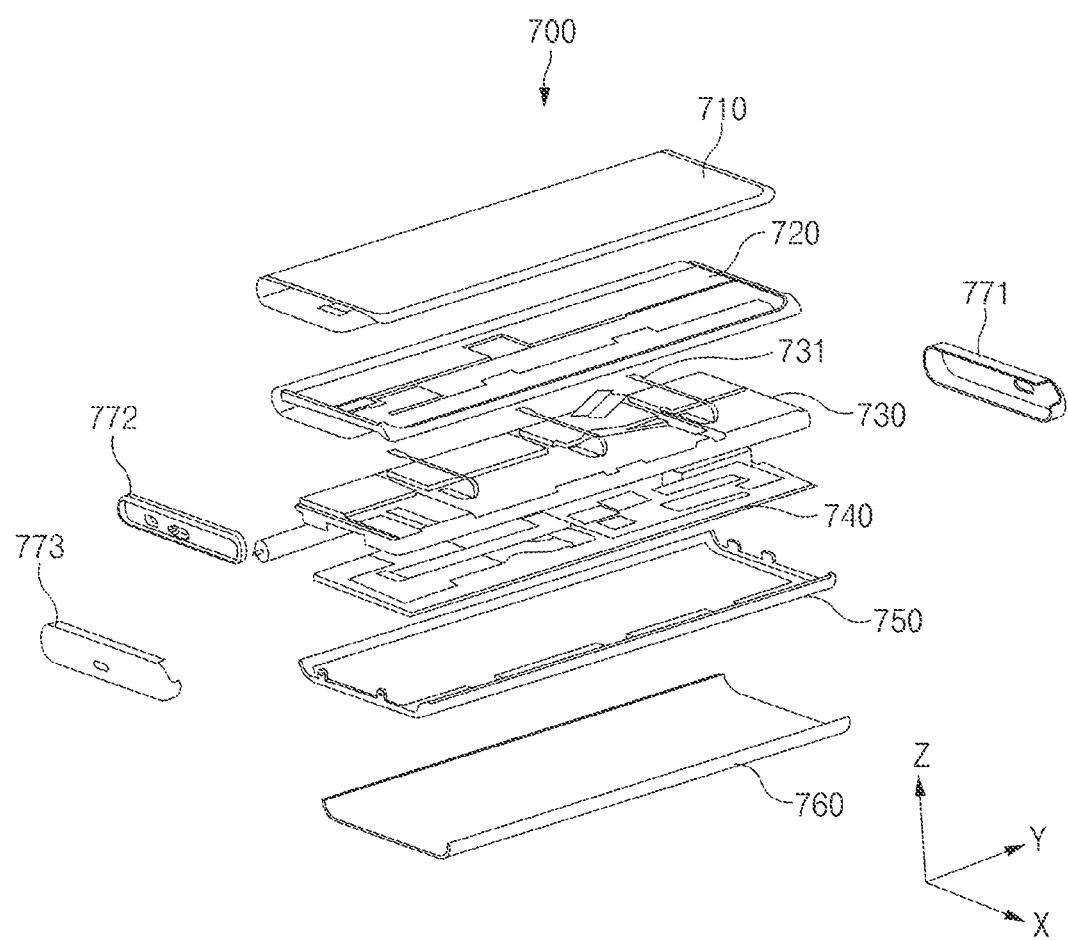
FIG. 7 is an exploded perspective view of an electronic device according to various example embodiments.

FIG. 7 is an exploded perspective view 700 of an electronic device (e.g., the electronic device 101 of FIG. 1) according to an embodiment. The electronic device 101 according to an embodiment may include a display 710 (e.g., the display 210 of FIG. 2), a display mounting part 720 (e.g., the display mounting part 630 of FIG. 6A), a support member 730 (e.g., the support member 620 of FIG. 6A), a PCB 740, a first housing 750 (e.g., the first housing 310 of FIG. 3A), a third housing 760 (e.g., the third housing 420 of FIG. 4A), and a second housing 771, 772, and 773 (e.g., the second housing 320 of FIG. 3B).

In an embodiment, the display 710 may display a screen. The display 710 may be mounted in a space formed by the first housing 750, the third housing 760, and the second housing 771, 772, and 773. At least a portion of the display 710 may be extended in the third direction (e.g., the +X-axis direction) of the electronic device 101. At least a partial area of the display 710 before the extension may be folded in the rear direction (the −Z-axis direction) of the electronic device 101. When the display 710 is extended, the area folded in the rear direction (the −Z-axis direction) of the electronic device 101 may face the front direction (the +Z-axis direction) of the electronic device 101. When the display 710 is extended, the area of the display 710 may be increased, and thus the display 710 may be expanded.

In an embodiment, the display mounting part 720 may be disposed on the rear surface of the display 710. The display mounting part 720 may support the display 710. The display mounting part 720 may have a shape corresponding to the display 710 folded in the rear direction (the −Z-axis direction) of the electronic device 101. The display mounting part 720 may fix the display 710 folded in the rear direction (the −Z-axis direction) of the electronic device 101.

In an embodiment, the support member 730 may be disposed on the rear surface of the display mounting part 720. The support member 730 may fix the positions of modules, IC chips, and circuits constituting the electronic device 101. The support member 730 may include a metal member 731.

In an embodiment, the metal member 731 may be disposed on the front surface of the support member 730. The metal member 731 may be disposed on the rear surface of the display 710. The metal member 731 may physically move the display 710. For example, the metal member 731 may move the display 710 in the third direction (e.g., the +X-axis direction). The metal member 731 may be a metal plate having a belt structure or a rail structure made of a metallic material.

In an embodiment, the PCB 740 may be disposed on the rear surface of the support member 730. The modules, the IC chips, and the circuits constituting the electronic device 101 may be disposed on the PCB 740. For example, a processor (e.g., the processor 120 of FIG. 1), comprising processing circuitry, may be disposed on the PCB 740.

In an embodiment, the first housing 750 may be disposed to surround side surfaces of the display 710, the display mounting part 720, the support member 730, and the PCB 740. The first housing 750 may protect the side surface of the electronic device 101. The display 710 may be extended via the first housing 750. For example, the first housing 750 may include an opening through which the display 710 protrudes.

In an embodiment, the third housing part 760 may be disposed to surround the rear surface of the PCB 740. The third housing 760 may protect the rear surface of the electronic device 101.

In an embodiment, the second housing 771, 772, and 773 may be disposed to surround upper and lower portions of the display 710, the display mounting part 720, the support member 730, and the PCB 740. The second housing 771, 772, and 773 may protect upper and lower portions of the electronic device 101. The second housing 771, 772, and 773 may include a plurality of holes, such as a connector terminal, a speaker hole, or a microphone hole.

Figure 8:
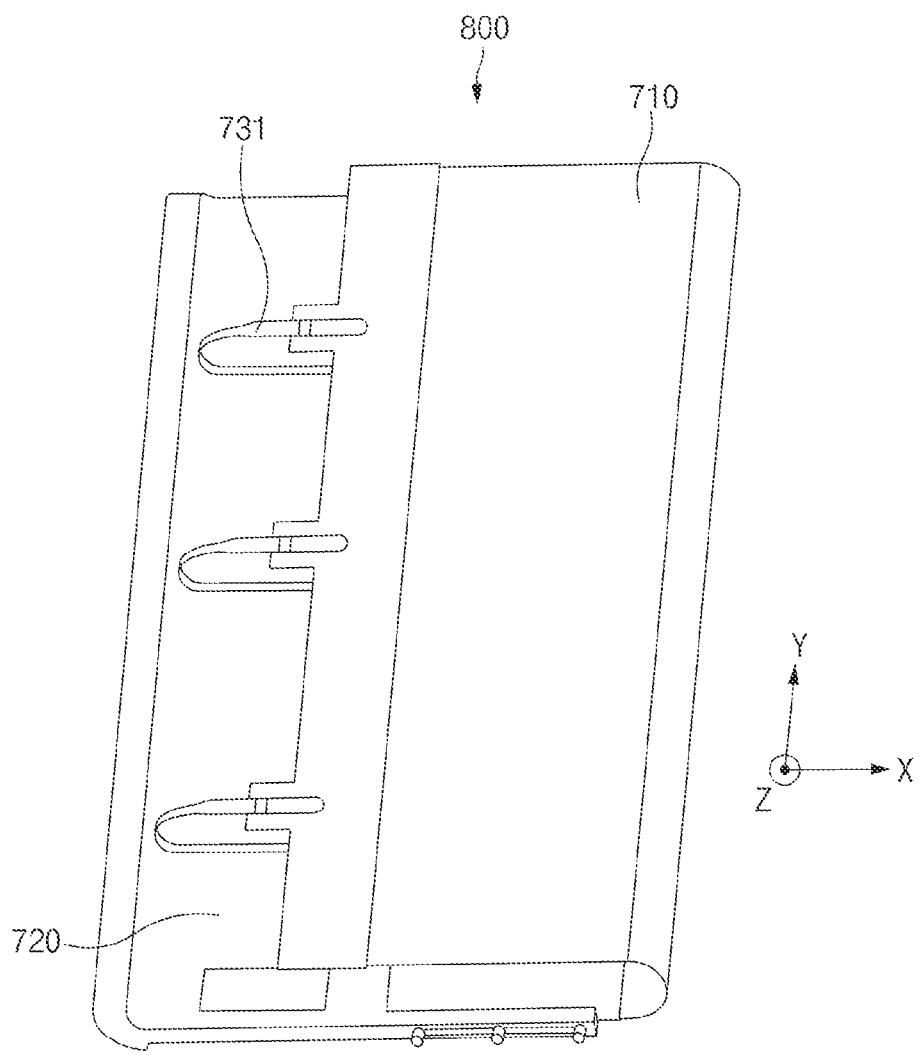
FIG. 8 is a view illustrating a display, a display mounting part, and a metal member of the electronic device according to various example embodiments.

FIG. 8 is a view illustrating the display 710, the display mounting part 720, and the metal member 731 of the electronic device (e.g., the electronic device 101 of FIG. 1) 800 according to an embodiment.

In an embodiment, the display mounting part 720 may have the display 710 mounted thereon. The metal member 731 may be disposed on the front surface of the display mounting part 720 to push or pull the display 710 in the third direction (e.g., the +X-axis direction).

Figure 9A:
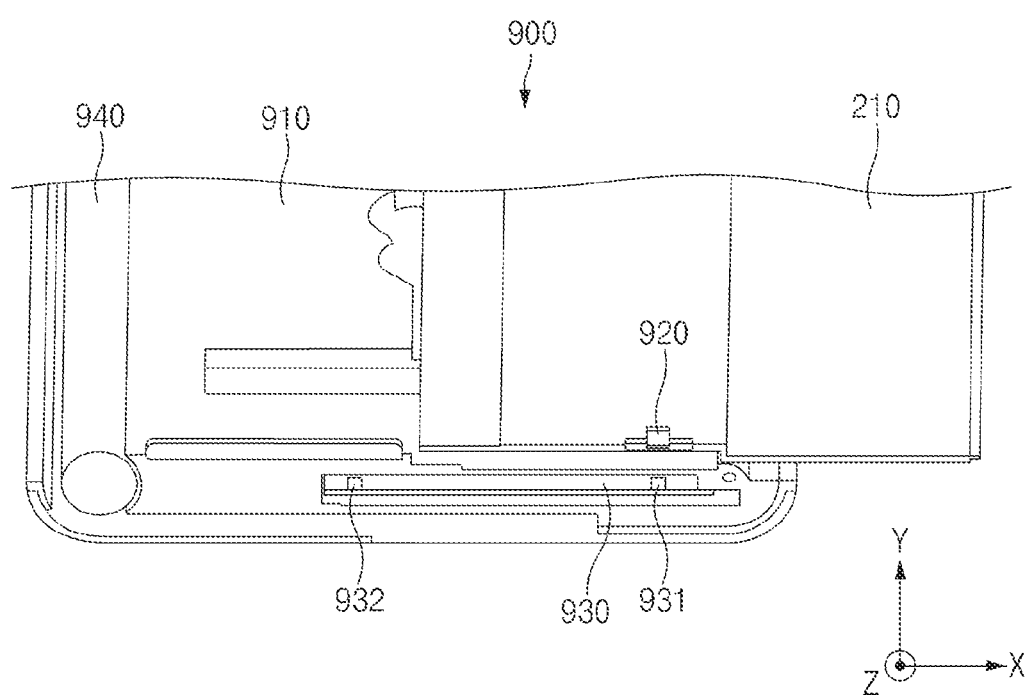
FIG. 9A is a view illustrating a sensing target, a first sensing unit, and a second sensing unit of an electronic device according to various example embodiments.

FIG. 9A is a view 900 illustrating a sensing target 920, a first sensing unit 931, and a second sensing unit 932 of an electronic device (e.g., the electronic device 101 of FIG. 1) according to an embodiment.

In an embodiment, a display 210 may move in the third direction (e.g., the +X-axis direction) from a display mounting part 910 (e.g., the display mounting part 630 of FIG. 6A). The display 210 may slide in the third direction (e.g., the +X-axis direction) based on rotation of a rotating unit 940 comprising a rotational body.

In an embodiment, the sensing target 920 may be disposed on the lower surface of the display 210. The sensing target 920 may be a reference position for sensing a position before a movement of the display 210, a movement distance, and/or a position upon completion of the movement. When the sensing target 920 is within a first distance, which is a specified interval, from the first sensing unit 931 or the second sensing unit 932 disposed on a PCB 930 (e.g., the PCB 740 of FIG. 7), the sensing target 920 may be sensed by the first sensing unit 931 or the second sensing unit 932.

In an embodiment, the first sensing unit 931 and the second sensing unit 932 may be disposed on the upper surface of the PCB 930. The first sensing unit 931 and the second sensing unit 932 may sense the sensing target 920. When the sensing target 920 enters within the first distance, a processor (e.g., the processor 120 of FIG. 1), comprising processing circuitry, may determine, through the first sensing unit 931 or the second sensing unit 932, whether the sensing target 920 is located in a position corresponding to the first sensing unit 931 or the second sensing unit 932 in the first direction (the +Z-axis direction). When the sensing target 920 enters within the first distance, the first sensing unit 931 or the second sensing unit 932 may provide, to the processor 120, sensing data indicating that the sensing target 920 closely approaches the first sensing unit 931 or the second sensing unit 932.

In an embodiment, the sensing target 920 may be a magnet, and the first sensing unit 931 and the second sensing unit 932 may be Hall sensors or magnetic-force detection sensors. The first sensing unit 931 and the second sensing unit 932 may determine whether the sensing target 920 enters within the first distance from the first sensing unit 931 or the second sensing unit 932, by sensing a change in a magnetic field due to the close approach of the sensing target 920.

In an embodiment, when the distance between the sensing target 920 and the first sensing unit 931 is shorter than the first distance, the processor 120, comprising processing circuitry, may determine an extended mode (e.g., the extended mode of FIG. 3B) in which the display 210 is extended in the third direction (the +X-axis direction) and a first area (e.g., the first area 510 of FIG. 5A) is displayed to be large. The processor 120 may configure and display a screen of the display 210 in response to the extended mode.

In an embodiment, when the distance between the sensing target 920 and the second sensing unit 932 is shorter than the first distance, the processor 120 may determine a normal mode (e.g., the normal mode of FIG. 3A) in which the display 210 is mounted on the display mounting part 910. The processor 120 may configure and display a screen of the display 210 in response to the normal mode.

FIG. 9A illustrates the case in which the sensing target 920 is disposed on the display 210 and the first sensing unit 931 and the second sensing unit 932 are disposed on the PCB 930. However, without being limited thereto, the sensing target 920 may be disposed on the PCB 930, and the first sensing unit 931 and the second sensing unit 932 may be disposed on the display 210. Furthermore, FIG. 9A illustrates the case in which one sensing target 920 and two sensing units 931 and 932 are provided. However, without being limited thereto, two sensing targets 920 and one or more sensing units 931 or 932 may be provided.

Figure 9B:
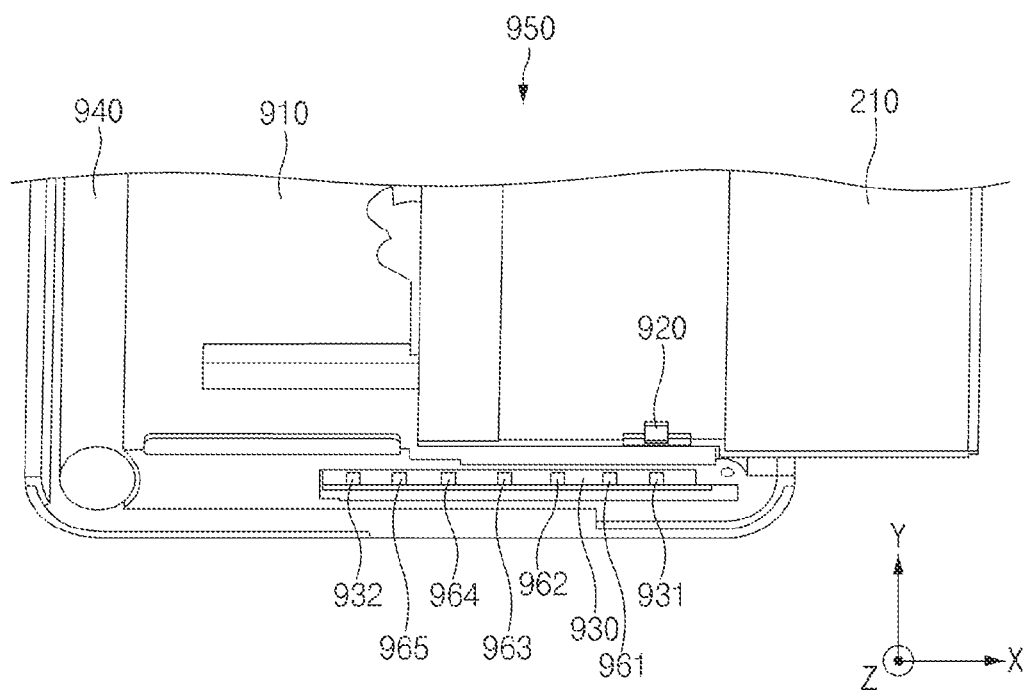
FIG. 9B is a view illustrating a sensing target and a plurality of sensing units of an electronic device according to various example embodiments.

FIG. 9B is a view 950 illustrating a sensing target 920 and a plurality of sensing units 931, 932, 961, 962, 963, 964, and 965 of an electronic device according to an embodiment.

In an embodiment, the plurality of sensing units 931, 932, 961, 962, 963, 964, and 965 may be disposed on the upper surface of a PCB 930. The plurality of sensing units 931, 932, 961, 962, 963, 964, and 965 may be spaced apart from each other by a first distance that is a specified interval. When the sensing target 920 enters within the first distance, each of the plurality of sensing units 931, 932, 961, 962, 963, 964, and 965 may provide, to a processor 120, sensing data indicating that the sensing target 920 is located in a corresponding position in the first direction (the +Z-axis direction).

In an embodiment, when the sensing target 920 is within the first distance from at least one of the plurality of sensing units 931, 932, 961, 962, 963, 964, and 965, the processor 120 may identify a movement distance and the current position of a display 210, based on the position in which the sensing target 920 is sensed. The processor 120 may identify the size of a first area by which the display 210 is extended in the third direction (the +X-axis direction) and may calculate the size of a display area of the display 210. The processor 120 may configure and display a screen of the display 210 in response to the size of the display area. When the display 210 moves in the third direction (the +X-axis direction or the −X-axis direction) and the size of the display area of the display 210 is changed, the processor 120 may reconfigure the screen in response to the change in the size of the display area.

FIG. 9B illustrates the case in which the sensing target 920 is disposed on the display 210 and the plurality of sensing units 931, 932, 961, 962, 963, 964, and 965 are disposed on the PCB 930. However, without being limited thereto, the sensing target 920 may be disposed on the PCB 930, and the plurality of sensing units 931, 932, 961, 962, 963, 964, and 965 may be disposed on the display 210. Furthermore, FIG. 9B illustrates the case in which one sensing target 920 and N sensing units 931, 932, 961, 962, 963, 964, and 965 (N being a natural number of 3 or larger, e.g., N=7 in FIG. 9B) are provided. However, without being limited thereto, N sensing targets 920 and one sensing unit 931 or 932 may be provided.

Figure 10:
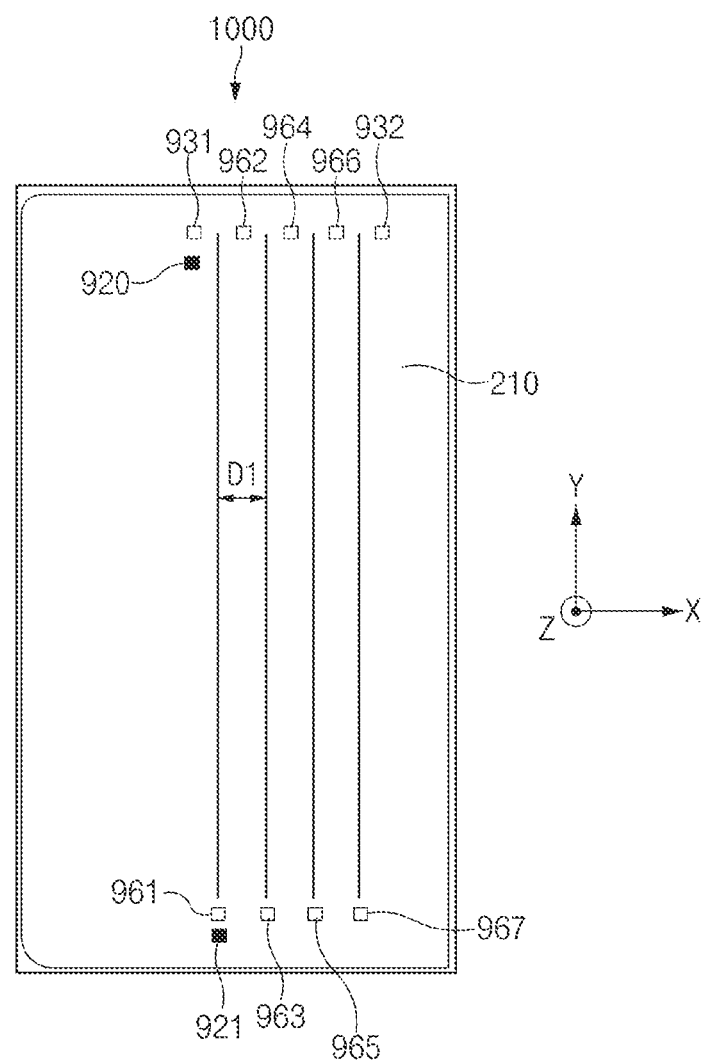
FIG. 10 is a view illustrating sensing targets and a plurality of sensing units of an electronic device according to various example embodiments.

FIG. 10 is a view 1000 illustrating sensing targets 920 and 921 and a plurality of sensing units 931, 932, 961, 962, 963, 964, 965, 966, and 967 of an electronic device according to another embodiment.

In an embodiment, the plurality of sensing units 931, 932, 961, 962, 963, 964, 965, 966, and 967 may be disposed to form at least one row facing the third direction (the X-axis direction). For example, the first row 931, 962, 964, 966, and 932 may be arranged to form a row facing the third direction (the X-axis direction) in an upper portion of a display 210, and the second row 961, 963, 965, and 967 may be arranged to form a row facing the third direction (the X-axis direction) in a lower portion of the display 210.

In an embodiment, the sensing targets 920 and 921 may be disposed to be spaced apart from each other in a direction different from the direction of movement of the display 210. For example, based on the Y-axis direction perpendicular to the third direction (the X-axis direction), the first sensing target 920 may be disposed in the upper portion of the display 210, and the first sensing target 920 may be disposed in the lower portion of the display 210.

In an embodiment, the sensing targets 920 and 921 may be disposed to be staggered with respect to each other based on the direction of movement of the display 210. For example, the sensing targets 920 and 921 may be disposed to be staggered with respect to each other based on the third direction (the X-axis direction).

In an embodiment, the first row 931, 962, 964, 966, and 932 and the second row 961, 963, 965, and 967 may be disposed to be staggered with respect to each other based on the direction of movement of the display 210. For example, the first row 931, 962, 964, 966, and 932 and the second row 961, 963, 965, and 967 may be disposed to be staggered with respect to each other by a distance shorter than a first distance D1 based on the third direction (the X-axis direction).

In an embodiment, each of the sensing units in the first row 931, 962, 964, 966, and 932 may sense whether the first sensing target 920 is within the first distance D1. Each of the sensing units in the second row 961, 963, 965, and 967 may sense whether the second sensing target 921 is within the first distance D1.

In an embodiment, when the sensing targets 920 and 921, the first row 931, 962, 964, 966, and 932, and the second row 961, 963, 965, and 967 are disposed to be staggered with respect to one another based on the direction of movement of the display 210, one of the first row 931, 962, 964, 966, and 932 or the second row 961, 963, 965, and 967 may sense whether the sensing targets 920 and 921 are moved or not, even though the display 210 moves less than the first distance D1. Accordingly, the distance of a sensing section for measurement of a movement distance of the display 210 may be decreased, and sensing resolution may be increased.

Figure 11:
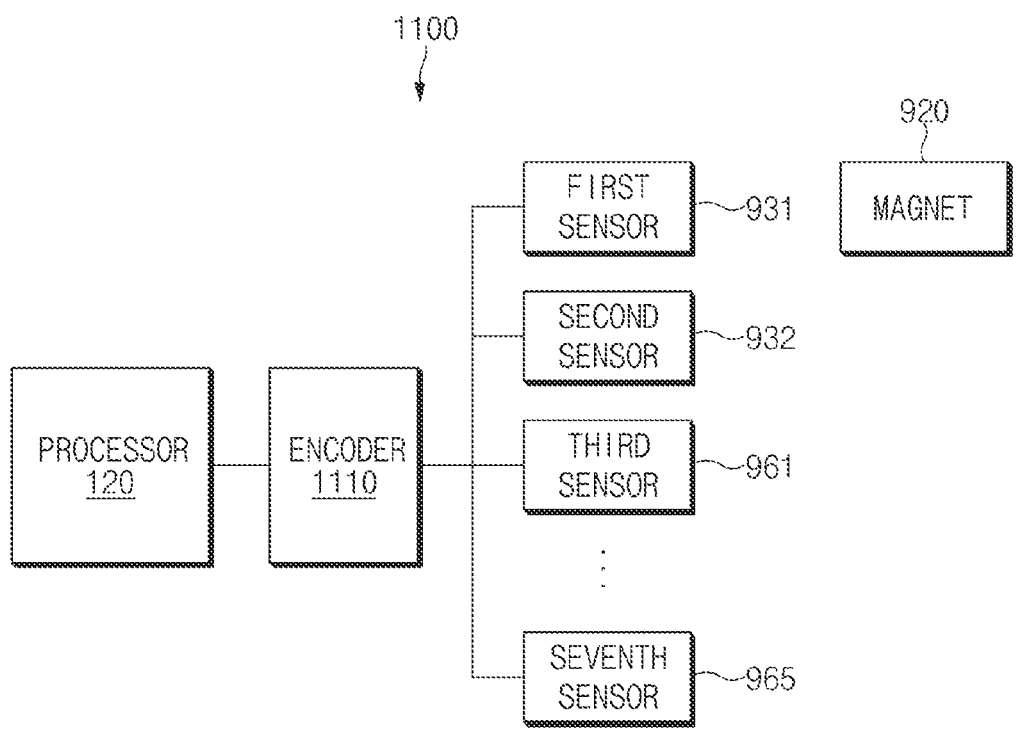
FIG. 11 is a block diagram illustrating components for measurement of a movement distance of a display of an electronic device according to various example embodiments.

FIG. 11 is a block diagram 1100 illustrating components for measurement of a movement distance of a display (e.g., the display 210 of FIG. 2) of an electronic device (e.g., the electronic device 101 of FIG. 1) according to an embodiment.

In an embodiment, a first sensor 931, a second sensor 932, a third sensor 961, . . . , and a seventh sensor 965 may each sense whether a magnet 920 enters within a first distance. The first sensor 931, the second sensor 932, the third sensor 961, . . . , and the seventh sensor 965 may each be triggered by the magnet 920. The first sensor 931, the second sensor 932, the third sensor 961, . . . , and the seventh sensor 965 may generate sensing data when the magnet 920 enters within the first distance.

In an embodiment, the first sensor 931, the second sensor 932, the third sensor 961, . . . , and the seventh sensor 965 is electrically connected with an encoder 1110. The encoder 1110 may convert the sensing data into movement information. The movement information may include a position before a movement of the display 210, a position after the movement of the display 210, and/or a movement distance of the display 210. For example, the encoder 1110 may convert the sensing data into the movement distance of the display 210 by patterning the arrangement of the first sensor 931, the second sensor 932, the third sensor 961, . . . , and the seventh sensor 965.

In an embodiment, a processor 120 may be configured to receive the movement information from the encoder 1110. Based on the movement information, the processor 120 may identify the position before the movement of the display 210, the position after the movement of the display 210, and/or the movement distance of the display 210. The processor 120 may identify the size of a display area of the display 210 depending on the position before the movement of the display 210, the position after the movement of the display 210, and/or the movement distance of the display 210.

Figure 12:
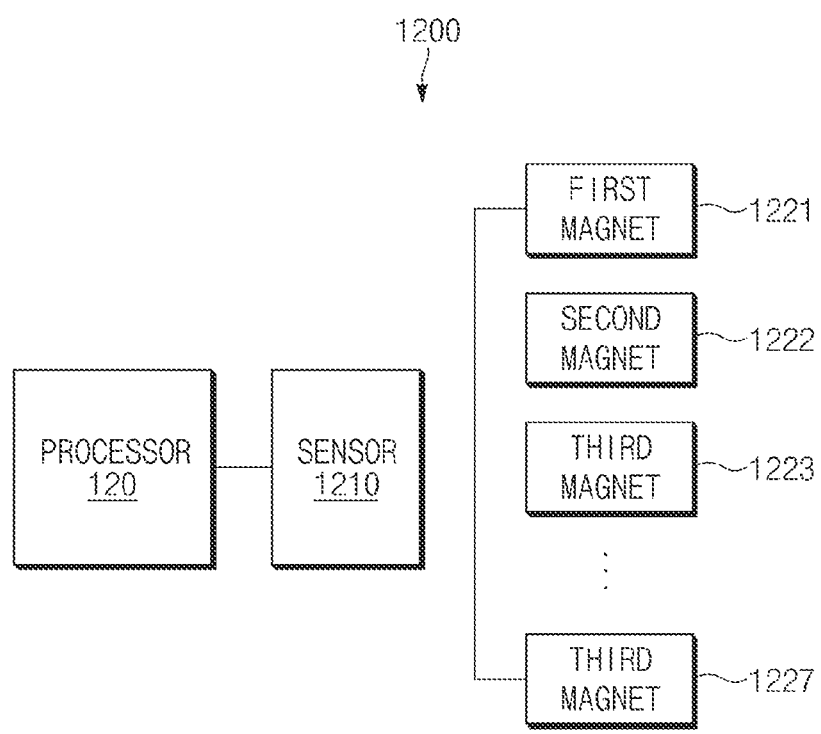
FIG. 12 is a block diagram illustrating components for measurement of a movement distance of a display of an electronic device according to various example embodiments.

FIG. 12 is a block diagram 1200 illustrating components for measurement of a movement distance of a display (e.g., the display 210 of FIG. 2) of an electronic device (e.g., the electronic device 101 of FIG. 1) according to another embodiment.

In an embodiment, a sensor 1210 may sense whether a first magnet 1221, a second magnet 1222, a third magnet 1223, . . . , or a seventh magnet 1227 enters within a first distance. The sensor 1210 may be triggered when the first magnet 1221, the second magnet 1222, the third magnet 1223, . . . , or the seventh magnet 1227 enters within the first distance. The sensor 1210 may estimate the position of the display 210 and may transfer movement information to a processor 120. For example, the sensor 1210 may estimate a movement distance of the display 210, based on the number of times that the sensor 1210 is triggered.

FIG. 12 illustrates the structure constituted by the first magnet 1221, the second magnet 1222, the third magnet 1223, . . . , or the seventh magnet 1227 and the sensor 1210 that senses the first magnet 1221, the second magnet 1222, the third magnet 1223, . . . , or the seventh magnet 1227. However, without being limited thereto, the first magnet 1221, the second magnet 1222, the third magnet 1223, . . . , or the seventh magnet 1227 and the sensor 1210 may be replaced with a plurality of electrical contacts. In the case in which the first magnet 1221, the second magnet 1222, the third magnet 1223, . . . , or the seventh magnet 1227 and the sensor 1210 are replaced with the plurality of electrical contacts, two electrical contacts may be electrically connected to cause a change of state when the two electrical contacts make contact with each other. Based on the electrical state change, the processor 120 may calculate whether the display 210 is moved and/or a movement distance of the display 210. The plurality of electrical contacts may be implemented with a structure having a protruding structure, such as a pogo pin or a C-clip, and capable of performing up/down motion and/or a planer metal plate.

Figure 13:
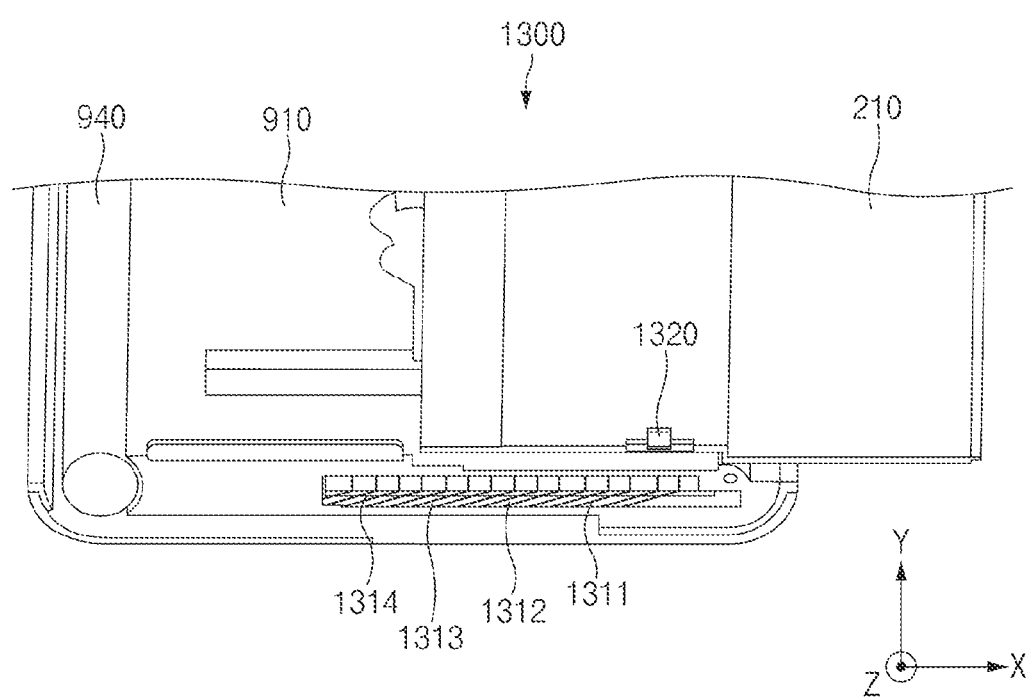
FIG. 13 is a view illustrating a sensing target and a plurality of sensing units of an electronic device according to various example embodiments.

FIG. 13 is a view 1300 illustrating a sensing target 1320 and a plurality of sensing units 1311, 1312, 1313, and 1314 of an electronic device (e.g., the electronic device 101 of FIG. 1) according to another embodiment.

In an embodiment, the plurality of sensing units 1311, 1312, 1313, and 1314 may be a plurality of permittivity sensing patterns. Each of the permittivity sensing patterns may measure the permittivity of an object within a specified distance. When the permittivity of the object within the specified distance is changed, each of the permittivity sensing patterns may generate a notification signal to provide notification that the characteristics of the object are changed. The sensing target 1320 may be a dielectric body. The sensing target 1320 may be disposed on the lower surface of a display 210. For example, the sensing target 1320 may be disposed on a rail for a movement of the display 1320. The plurality of sensing units 1311, 1312, 1313, and 1314 may be disposed under the display 210. The plurality of sensing units 1311, 1312, 1313, and 1314 may be disposed within a movement range in which the sensing target 1320 is capable of moving depending on a movement of the display 210.

In an embodiment, each of the plurality of sensing units 1311, 1312, 1313, and 1314 may sense whether the sensing target 1320 enters within a first distance. Each of the plurality of sensing units 1311, 1312, 1313, and 1314 may sense a change in permittivity. Each sensing unit herein may comprise sensing circuitry. Each of the plurality of sensing units 1311, 1312, 1313, and 1314 may sense movement information when the dielectric body enters within the first distance. Each of the plurality of sensing units 1311, 1312, 1313, and 1314 may transfer the sensed movement information to a processor (e.g., the processor 120 of FIG. 1). Based on the movement information, the processor 120 may calculate the movement distance of the display 210 and/or the size of a screen displayed on the display 210.

Figure 14:
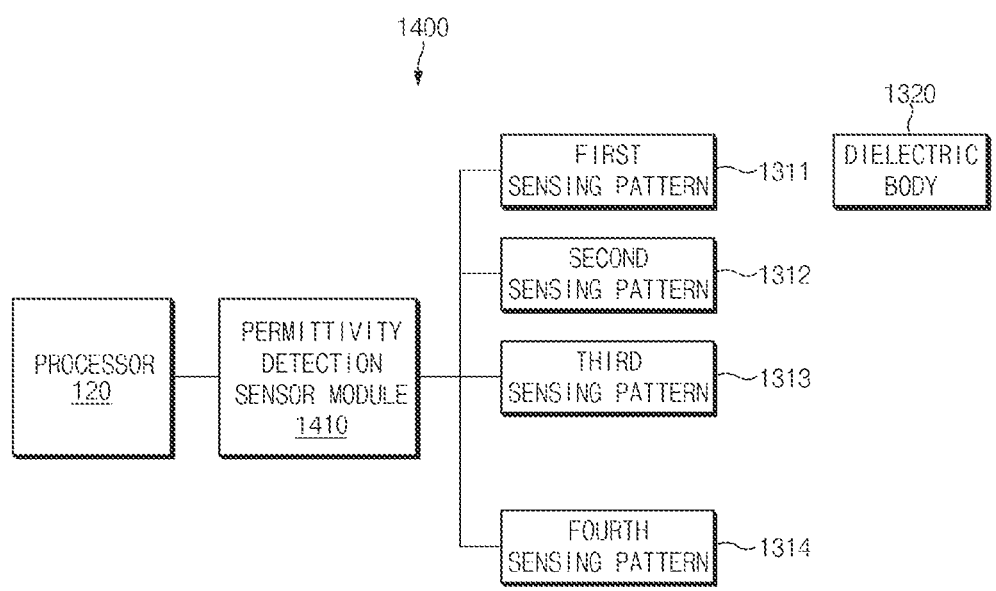
FIG. 14 is a block diagram illustrating components for measurement of a movement distance of a display of an electronic device according to various example embodiments.

FIG. 14 is a block diagram 1400 illustrating components for measurement of a movement distance of a display (e.g., the display 210 of FIG. 2) of an electronic device (e.g., the electronic device 101 of FIG. 1) according to another embodiment.

In an embodiment, a first sensing pattern 1311, a second sensing pattern 1312, a third sensing pattern 1313, and a fourth sensing pattern 1314 may each sense whether a dielectric body 1320 enters within a first distance. When the dielectric body 1320 enters within the first distance, each of the first sensing pattern 1311, the second sensing pattern 1312, the third sensing pattern 1313, and the fourth sensing pattern 1314 may generate sensing data to notify of close approach of the dielectric body 1320.

In an embodiment, a permittivity detection sensor module 1410 may receive the sensing data from the first sensing pattern 1311, the second sensing pattern 1312, the third sensing pattern 1313, and the fourth sensing pattern 1314. The permittivity detection sensor module 1410, including detection circuitry, may generate movement information based on the sensing data and may transfer the movement information to a processor 120.

Figure 15A:
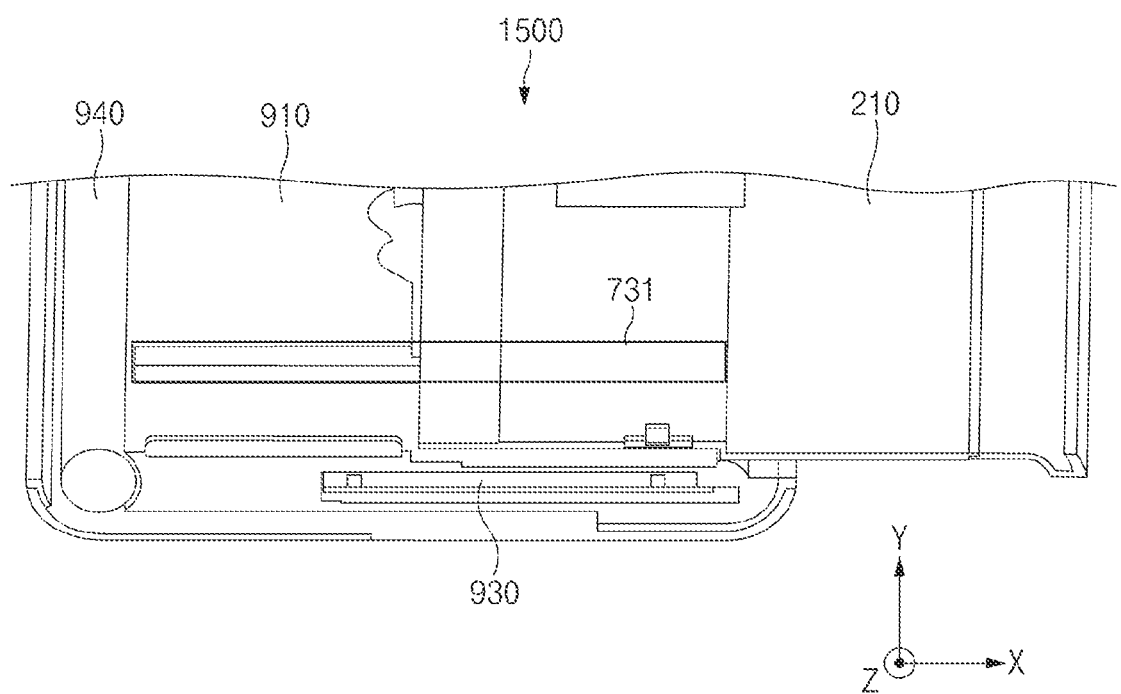
FIG. 15A is a view illustrating an extended mode in which a display is extended by extending a metal member of an electronic device according to various example embodiments.
Figure 15B:
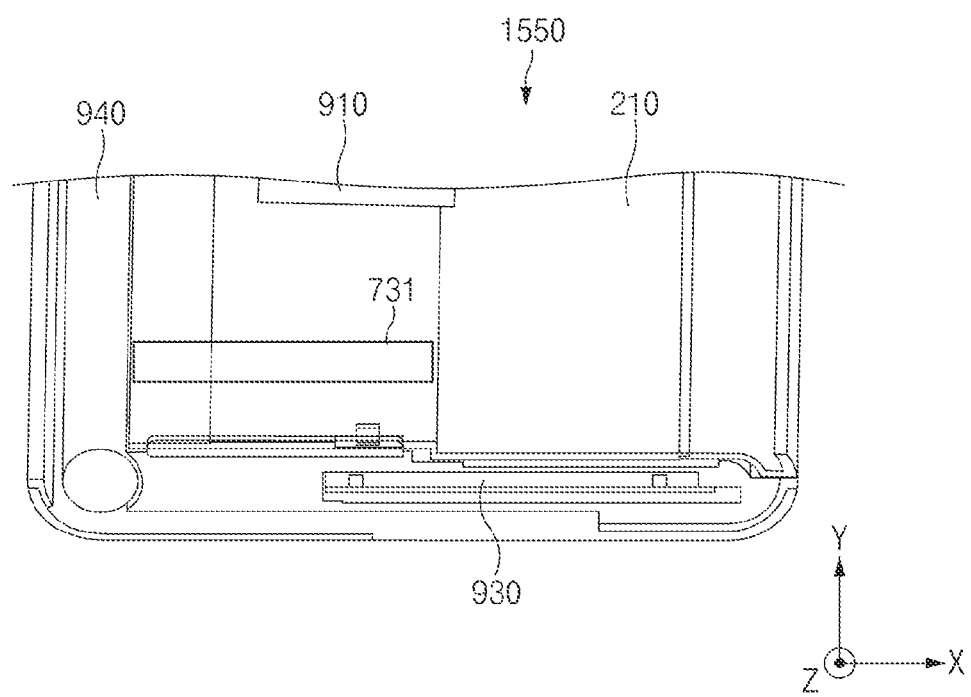
FIG. 15B is a view illustrating a normal mode in which the display is retracted by retracting the metal member of the electronic device according to various example embodiments.

FIG. 15A is a view 1500 illustrating an extended mode (e.g., the extended mode of FIG. 3B) in which a display (e.g., the display 210 of FIG. 2) is extended by extending a metal member 731 of an electronic device (e.g., the electronic device 101 of FIG. 1) according to an embodiment. FIG. 15B is a view 1550 illustrating a normal mode (e.g., the normal mode of FIG. 3A) in which the display 210 is retracted by retracting the metal member 731 of the electronic device 101 according to an embodiment.

In an embodiment, the metal inclusive member 731 (which may include metal, or be made substantially or essentially of metal) may be disposed inside a housing (e.g., the first housing 310 of FIG. 3A, the second housing 320, and the third housing 420 of FIG. 3B). The metal inclusive member 731 may move the display 210 while changing the length of the metal member 731. For example, the metal inclusive member 731 may be a belt type metal plate for physically moving the display 210. In another example, the metal member 731 may be a structure such as a metal rail. The metal member 731 may move the display 210 in the third direction (the X-axis direction) while pushing or pulling the display 210.

In an embodiment, at least one processor (e.g., the processor 120 of FIG. 1), comprising processing circuitry may sense a change in resistance depending on a change in the length of the metal member 731. The length of the metal inclusive member 731 may be changed depending on whether the display 210 is in the extended mode or the normal mode. For example, the length of the metal member 731 may be decreased to change the display 210 from the extended mode to the normal mode.

In an embodiment, the at least one processor 120 may be electrically connected with the metal member 731 through electrical contacts at opposite sides of the metal member 731. When the length of the metal member 731 is physically changed, the resistance value between the electrical contacts at the opposite sides of the metal member 731 may be changed. The processor 120 may sense the change in the resistance value between the electrical contacts at the opposite sides of the metal member 731. For example, the processor 120 may sense the change in the resistance value between the electrical contacts at the opposite sides of the metal member 731 by using an ADC.

In an embodiment, the at least one processor 120 may be configured to calculate a movement distance of the display 210 based on a change in resistance. Memory (e.g., the memory 130 of FIG. 1) may store correlation data in the form of a table in which at least a resistance value and a change in the length of the metal member 731 are defined. The processor 120 may compare the sensed change in the resistance value between the electrical contacts at the opposite sides of the metal member 731 with the correlation data stored in advance. The processor 120 may calculate the movement distance of the display 210 based on the comparison result.

Figure 16:
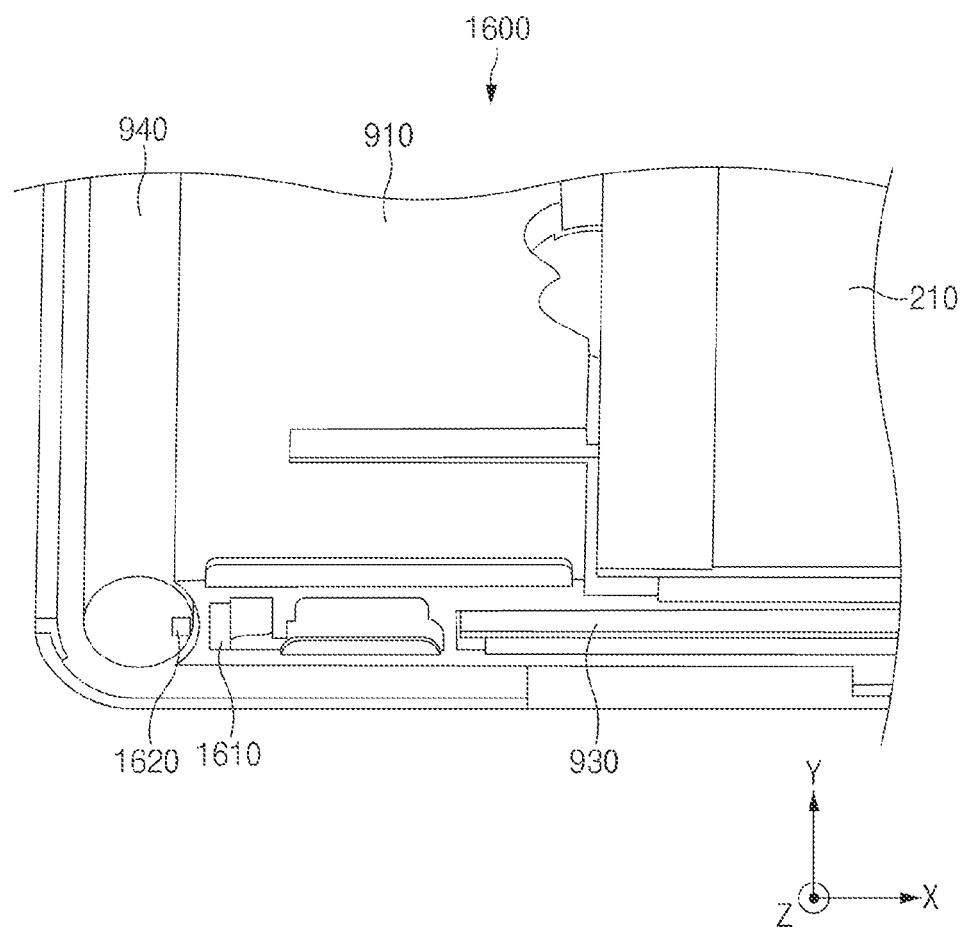
FIG. 16 is a view illustrating a sensing target disposed on a rotating unit of an electronic device and a sensing unit disposed on a side surface of a housing according to various example embodiments.

FIG. 16 is a view 1600 illustrating a sensing target 1620 disposed on a rotating unit 940 of an electronic device (e.g., the electronic device 101 of FIG. 1) and a sensing unit 1610 disposed on a side surface of a housing (e.g., the first housing 310 of FIG. 3A) according to an embodiment.

In an embodiment, the rotating unit 940 may be disposed on a side surface of the housing 310. The rotating unit 940 may be disposed on a side surface of a display mounting part 910. The rotating unit 940 may move a display 210 while rotating. For example, the rotating unit 940 may extend the display 210 outside the display mounting part 910 by sliding the display 210 in the third direction (e.g., the X-axis direction) while rotating.

In an embodiment, the rotating unit 940 may include at least one sensing target 1620. The sensing target 1620 may be mounted on a surface of the rotating unit 940. The sensing target 1620 may be mounted in the Y-axis direction that is the long axis direction of the rotating unit 940. The sensing target 1620 may be a magnet. The sensing target 1620 may be sensed by the sensing unit 1610.

In an embodiment, the sensing unit 1610 may be disposed on the side surface of the housing 310. The sensing unit 1610 may be disposed on a side surface of the display mounting part 910. The sensing unit 1610 may be disposed adjacent to the rotating unit 940. The sensing unit 1610 may be a Hall sensor. The sensing unit 1610, including sensing circuitry, may sense a state in which the distance to the sensing target 1620 is shortest. The sensing unit 1610 may be electrically connected with a processor (e.g., the processor 120 of FIG. 1).

In an embodiment, the processor 120, comprising processing circuitry, may sense the number of revolutions of the rotating unit 940. The processor 120 may count, through the sensing unit 1610, the number of times that the sensing target 1620 passes through the point closest to the sensing unit 1610 by rotation of the rotating unit 940. The processor 120 may determine the count as the number of revolutions.

In an embodiment, the processor 120 may calculate the movement distance of the display 210 based on the number of revolutions of the rotating unit 940. The processor 120 may calculate the perimeter of the rotating unit 940 by multiplying the diameter of the rotating unit 940 and Pi. The processor 120 may calculate the movement distance of the display 210 by multiplying the perimeter of the rotating unit 940 by the number of revolutions.

In an embodiment, when a plurality of sensing targets 1620 are disposed at different positions on the rotating unit 940, the sensing unit 1610 may additionally calculate the angle of rotation of the rotating unit 940. The processor 120 may more precisely calculate the movement distance of the display 210 by using at least the angle of rotation of the rotating unit 940.

Figure 17:
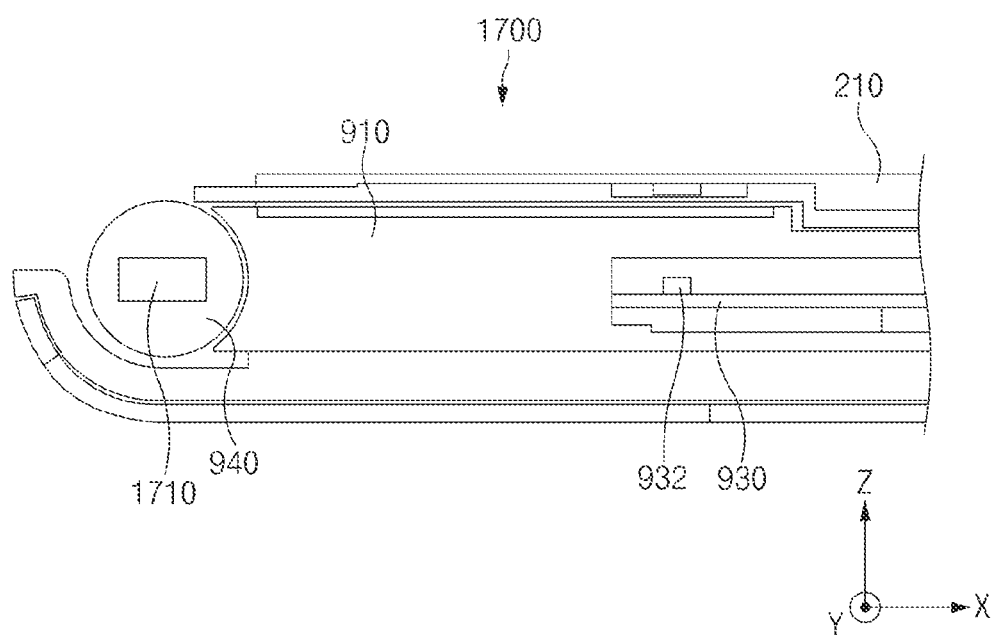
FIG. 17 is a view illustrating a rotation detection sensor disposed on a rotating unit of an electronic device according to various example embodiments.

FIG. 17 is a view 1700 illustrating a rotation detection sensor 1710 disposed on a rotating unit 940 of an electronic device (e.g., the electronic device 101 of FIG. 1) according to an embodiment.

In an embodiment, the rotation detection sensor 1710 may be disposed inside the rotating unit 940. The rotation detection sensor 1710 may sense the number of revolutions and/or the angle of rotation of the rotating unit 940. The rotation detection sensor 1710 may count the number of revolutions once every time the angle of rotation exceeds 360 degrees. The rotation detection sensor 1710 may be a gyro sensor. The rotation detection sensor 1710 may be electrically connected with a processor 120.

In an embodiment, the processor 120 may calculate the movement distance of a display 210 based on the number of revolutions of the rotating unit 940. The processor 120 may calculate the movement distance of the display 210 by multiplying the perimeter of the rotating unit 940 by the number of revolutions. The processor 120 may calculate the size of a display area of the display 210 based on the movement distance of the display 210 and may configure and display a screen in response to the size of the display area.

Figure 18A:
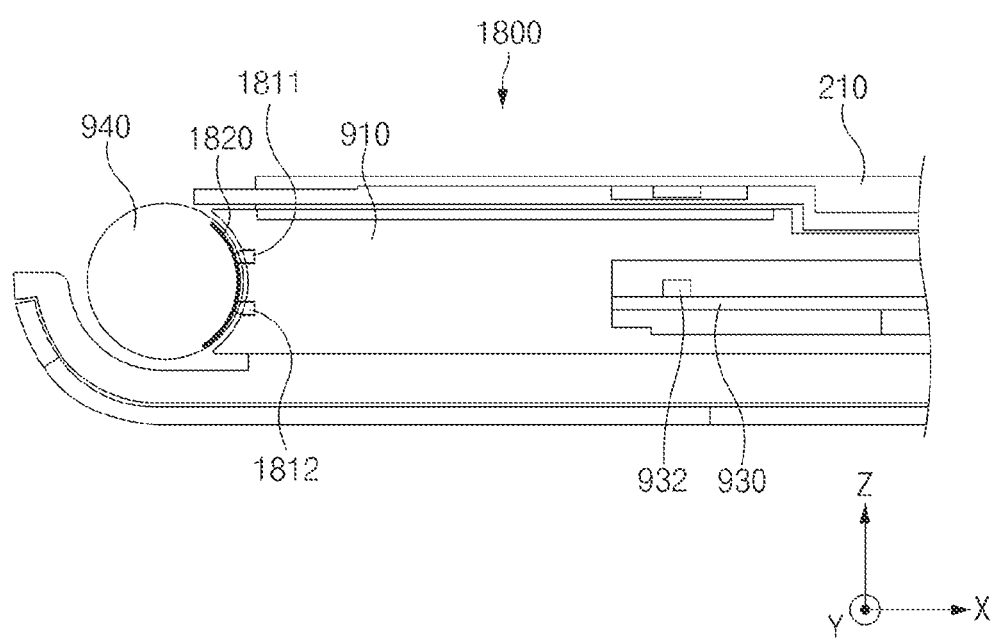
FIG. 18A is a view illustrating a metal pattern disposed on a rotating unit of an electronic device and connecting parts disposed on a side surface of a housing according to various example embodiments.
Figure 18B:
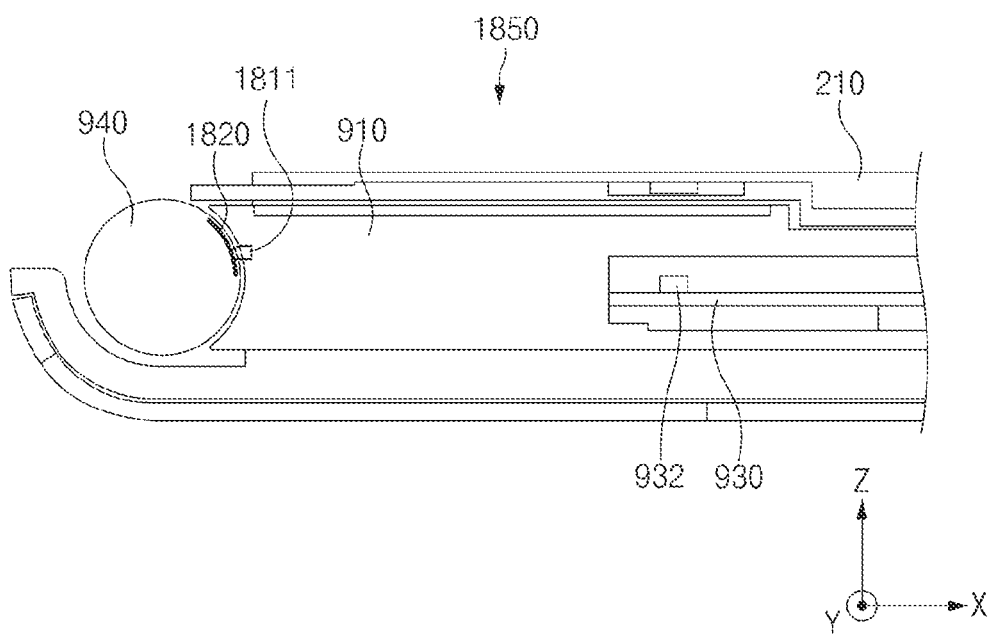
FIG. 18B is a view illustrating a metal pattern disposed on the rotating unit of the electronic device and a connecting part disposed on the side surface of the housing according to various example embodiments.
Figure 18C:
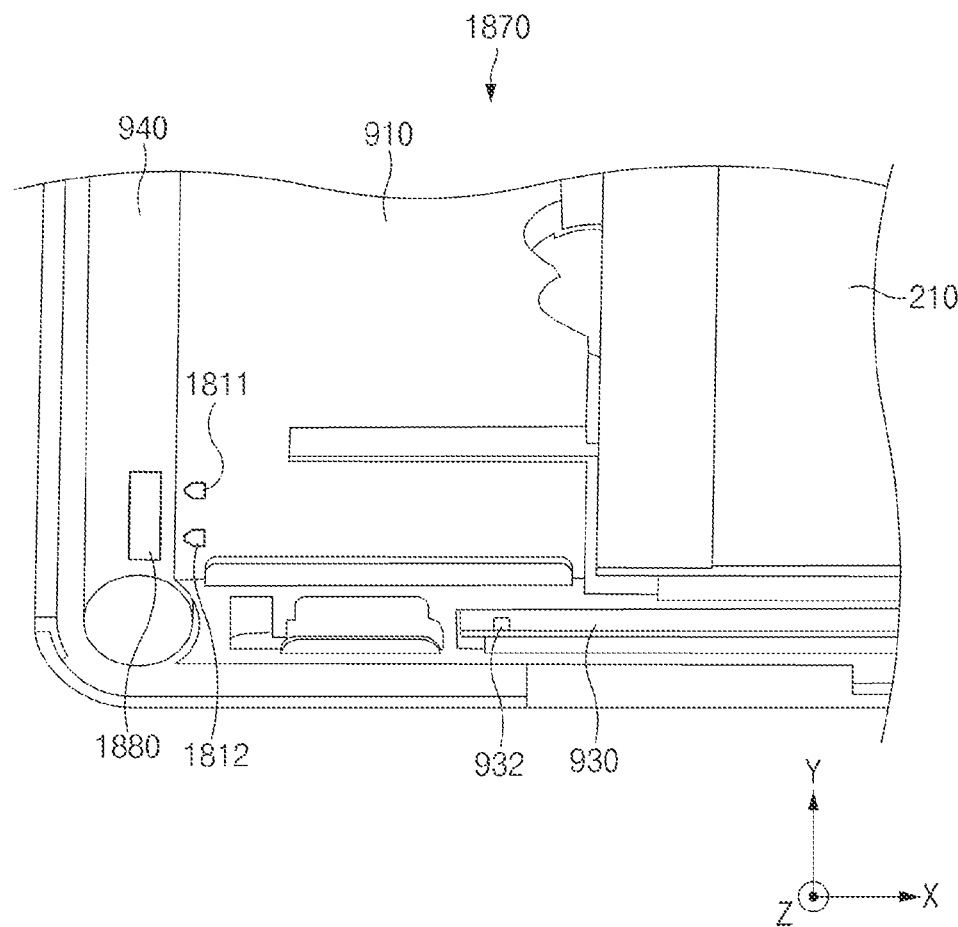
FIG. 18C is a view illustrating a metal pattern disposed on the rotating unit of the electronic device and connecting parts disposed on the side surface of the housing according to various example embodiments.

FIG. 18A is a view 1800 illustrating a metal pattern 1820 disposed on a rotating unit 940 of an electronic device (e.g., the electronic device 101 of FIG. 1) and connecting parts 1811 and 1812 disposed on a side surface of a housing (e.g., the first housing 310 of FIG. 3A) according to another embodiment. FIG. 18B is a view 1850 illustrating a metal pattern 1820 disposed on the rotating unit 940 of the electronic device 101 and a connecting part 1811 disposed on the side surface of the housing 310 according to another embodiment. FIG. 18C is a view 1870 illustrating a metal pattern 1880 disposed on the rotating unit 940 of the electronic device 101 and connecting parts 1811 and 1812 disposed on the side surface of the housing 310 according to another embodiment.

In an embodiment, the rotating unit 940 may further include at least one metal inclusive pattern 1820 or 1880. The metal inclusive pattern 1820 or 1880 may be a structure capable of electrical contact with a terminal protruding from the housing 310. The metal pattern 1820 or 1880 may be disposed on a surface of the rotating unit 940. The metal pattern 1820 or 1880 may have a specified length. For example, the metal pattern 1820 may have a specified length in the direction of rotation of the rotating unit 940 as illustrated in FIGS. 18A and 18B. In another example, the metal pattern 1880 may have a specified length in the long axis direction of the rotating unit 940 as illustrated in FIG. 18C. The metal pattern 1820 or 1880 may have a specified voltage such as a ground (GND) voltage. The metal pattern 1820 or 1880 may be electrically connected with a ground layer of a PCB 930.

In an embodiment, the connecting parts 1811 and 1812 may be disposed on the side surface of the housing 310. The connecting parts 1811 and 1812 may be electrically connected with a processor (e.g., the processor 120 of FIG. 1). The connecting parts 1811 and 1812 may electrically connect the metal pattern 1820 or 1880 with the processor 120. The connecting parts 1811 and 1812 may be structures such as a C-clip or a pogo pin capable of metal contact. The connecting parts 1811 and 1812 may receive an electrical signal from the processor 120 and may transfer the electrical signal to the metal pattern 1820.

In an embodiment, the processor 120 may supply an electrical signal to the metal pattern 1820 or 1880 using at least the connecting parts 1811 and 1812. The processor 120 may calculate the number of revolutions and/or the angle of rotation of the rotating unit 940, based on whether the connecting parts 1811 and 1812 and the metal pattern 1820 or 1880 are connected with each other. For example, the processor 120 may count the number of revolutions once every time the connecting parts 1811 and 1812 and the metal pattern 1820 or 1880 are connected with each other. The processor 120 may calculate the movement distance of a display 210, based on the number of revolutions and/or the angle of rotation of the rotating unit 940. The processor 120 may calculate the size of a display area of the display 210 based on the movement distance of the display 210 and may configure and display a screen in response to the size of the display area.

Figure 19A:
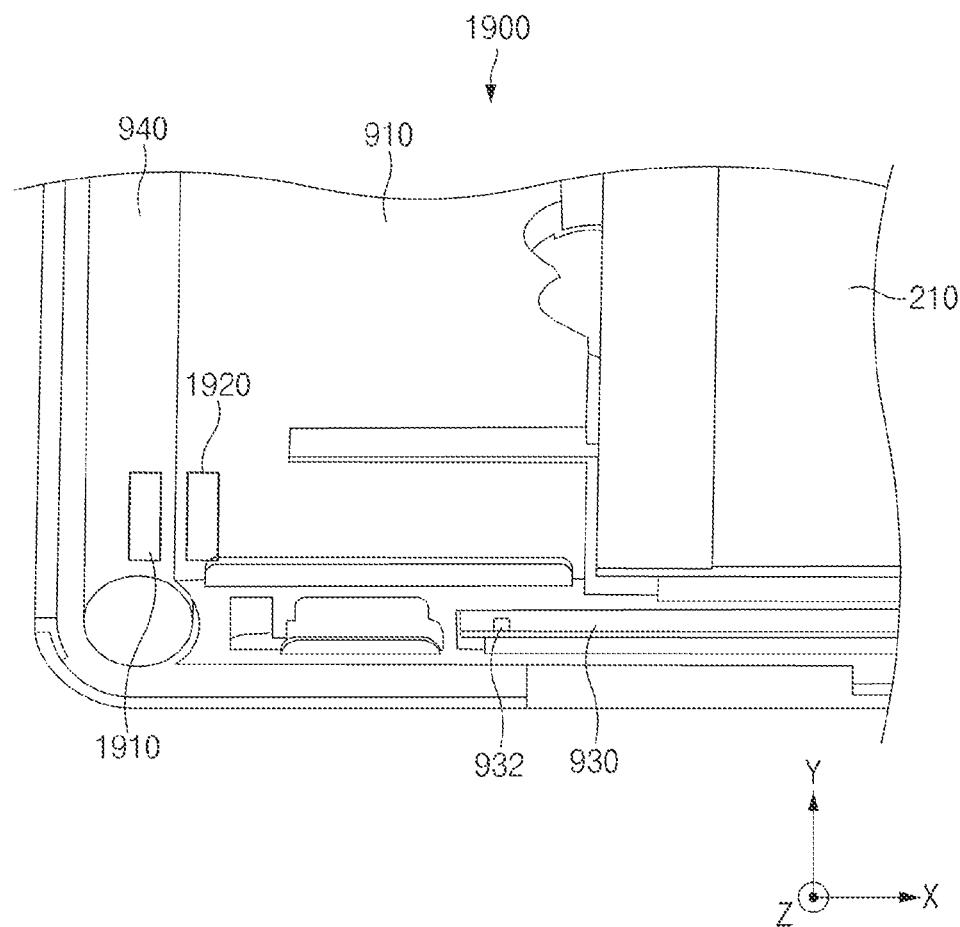
FIG. 19A is a view illustrating a dielectric body disposed on a rotating unit of an electronic device and a permittivity detection sensor disposed on a side surface of a housing according to various embodiments.
Figure 19B:
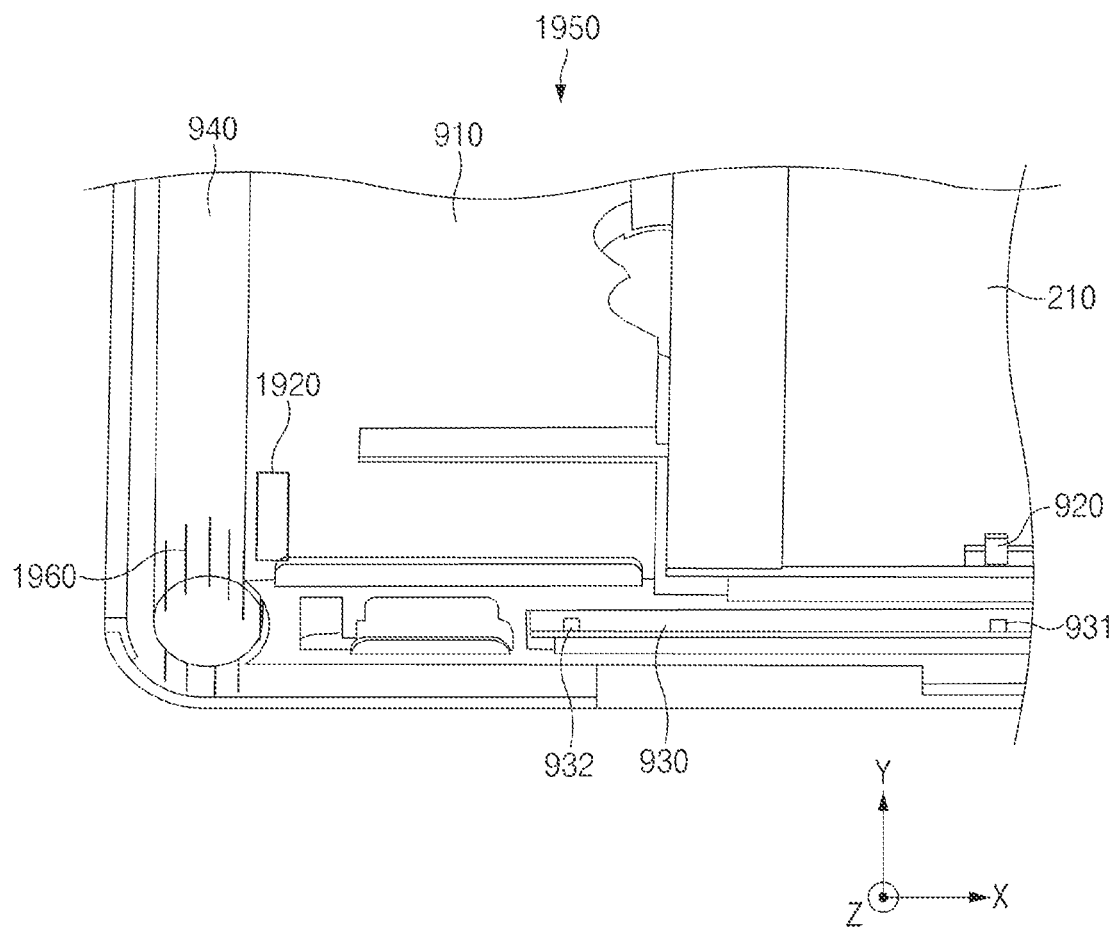
FIG. 19B is a view illustrating a dielectric pattern disposed on the rotating unit of the electronic device and the permittivity detection sensor disposed on the side surface of the housing according to various example embodiments.

FIG. 19A is a view 1900 illustrating a dielectric body 1910 disposed on a rotating unit 940 of an electronic device (e.g., the electronic device 101 of FIG. 1) and a permittivity detection sensor 1920 disposed on a side surface of a housing (e.g., the first housing 310 of FIG. 3A) according to another embodiment. FIG. 19B is a view 1950 illustrating a dielectric pattern 1960 disposed on the rotating unit 940 of the electronic device 101 and the permittivity detection sensor 1920 disposed on the side surface of the housing 310.

In an embodiment, the rotating unit 940 may further include at least one dielectric body 1910 or 1960. The at least one dielectric body 1910 or 1960 may be disposed on a surface of the rotating unit 940. For example, as illustrated in FIG. 19A, one dielectric body 1910 may be disposed on a single portion of the surface of the rotating unit 940. In another example, as illustrated in FIG. 19B, the dielectric pattern 1960 may be disposed on the surface of the rotating unit 940 at a specified interval.

In an embodiment, the permittivity detection sensor 1920 may be disposed on the side surface of the housing 310. The permittivity detection sensor 1920 may be disposed on a side surface of a display mounting part 910. The permittivity detection sensor 1920 may sense a change in the permittivity of an adjacent object. The permittivity detection sensor 1920 may determine whether the at least one dielectric body 1910 or 1960 approaches the permittivity detection sensor 1920 at a distance shorter than a specified distance.

In an embodiment, the permittivity detection sensor 1920 may be electrically connected with a processor (e.g., the processor 120 of FIG. 1). The permittivity detection sensor 1920 may transfer sensing data to the processor 120 when the dielectric body 1910 or 1960 approaches the permittivity detection sensor 1920 at a distance shorter than the specified distance.

In an embodiment, the processor 120 may calculate the number of revolutions and/or the angle of rotation of the rotating unit 940, based on the sensing data provided from the permittivity detection sensor 1920. For example, the processor 120 may count the number of revolutions once every time the dielectric body 1910 of FIG. 19A is sensed by the permittivity detection sensor 1920. In another example, the processor 120 may add a specified rotation angle every time the dielectric pattern 1960 of FIG. 19B is sensed by the permittivity detection sensor 1920. The processor 120 may calculate the movement distance of a display 210, based on the number of revolutions and/or the angle of rotation of the rotating unit 940. The processor 120 may calculate the size of a display area of the display 210 based on the movement distance of the display 210 and may configure and display a screen in response to the size of the display area.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art the various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
  a housing formed to at least partially surround a first surface facing a first direction, a second surface facing a second direction opposite to the first direction, and at least a portion of a space between the first surface and the second surface;
  a Printed Circuit Board (PCB) disposed in the space;
  a display configured to extend in a third direction different from the first direction and the second direction and configured to display a screen;
  at least one processor, wherein the PCB includes a plurality of first sensing units comprising sensing circuitry and arranged in a first row and a plurality of second sensing units comprising sensing circuitry and arranged in a second row spaced from the first row, wherein the plurality of first sensing units and the plurality of second sensing units are disposed to be shifted with respect to each other in the third direction; and a first sensing target and a second sensing target disposed on the display, wherein the first sensing target is disposed to be shifted from the second sensing target in the third direction and a fourth direction different from the third direction, wherein the plurality of first sensing units are configured to provide first sensing data indicating positioning of the first sensing target in relation to the plurality of first sensing units and the plurality of second sensing units are configured to provide second sensing data indicating positioning of the second sensing target in relation to the plurality of second sensing units, and wherein the processor is configured to calculate movement information including at least one of a movement start position of the display, a movement end position of the display, and a movement distance of the display, based on at least the first sensing data and the second sensing data.

2. The electronic device of claim 1, wherein the plurality of first and second sensing units comprise Hall sensors capable of sensing a magnetic force, and wherein the first and second sensing targets comprise a magnet and/or a magnetic body.

3. The electronic device of claim 1, further comprising:

a metal inclusive member disposed inside the housing and configured to move the display while changing a length of the metal inclusive member, wherein the processor is further configured to sense a change in resistance depending on the change in the length of the metal inclusive member and calculate the movement distance of the display based on at least the change in the resistance.

4. The electronic device of claim 1, further comprising:

a rotating unit, comprising a rotational body, disposed on a side surface of the housing and configured to cause the display to move, wherein the display is configured so as to be extended by rotation of the rotating unit so that a length of the display in the third direction can be longer than a length of the housing in the third direction.

5. The electronic device of claim 1, wherein the processor is further configured to change a screen displayed on the display by displaying contents on an extended area of the display based on at least the movement information.

6. An electronic device comprising:

a housing including a first surface configured to face a first direction, a second surface configured to face a second direction opposite to the first direction, and a side surface formed to at least partially surround a space between the first surface and the second surface;

a Printed Circuit Board (PCB) disposed in the space;

a display including a first area extending in a third direction different from the first direction and the second direction and configured to display a screen;

a rotating unit, comprising a rotational body, disposed on the side surface of the housing and configured to cause the display to move; and at least one processor, wherein the display includes a second area bent by the rotating unit, wherein the rotating unit includes at least one sensing target, wherein at least one sensing unit, comprising sensing circuitry, configured to sense the at least one sensing target, is disposed on the side surface of the housing adjacent to the rotating unit, and wherein the processor is configured to calculate movement information including a movement distance of the display, based on at least sensing data received from the at least one sensing unit.

7. The electronic device of claim 6, wherein the at least one sensing target comprises a magnet and/or a magnetic body, and wherein the at least one sensing unit comprises a Hall sensor configured for sensing a magnetic force.

8. The electronic device of claim 6, wherein the rotating unit further includes a rotation detection sensor configured to sense rotation of the rotating unit.

9. The electronic device of claim 6, wherein the rotating unit further includes at least one metal inclusive pattern, and wherein a connecting part configured to electrically connect the at least one metal inclusive pattern and the processor is disposed on the side surface of the housing.

10. The electronic device of claim 6, wherein the rotating unit further includes one or more dielectric bodies, and wherein a permittivity detection sensor is disposed on the side surface of the housing.

11. The electronic device of claim 6, wherein the movement information includes a number of revolutions of the rotating unit and/or an angle of rotation of the rotating unit.

12. The electronic device of claim 6, wherein the processor is configured to calculate an externally visible portion of the first area and/or the second area of the display, based on at least the movement information.

13. The electronic device of claim 6, wherein the PCB includes at least one second sensing unit comprising sensing circuitry, and wherein a second sensing target, to be sensed by the at least one second sensing unit within a specified distance, is disposed in the second direction of the display.

* * * * *